(12) United States Patent
Nagai et al.

(10) Patent No.: US 7,265,913 B2
(45) Date of Patent: Sep. 4, 2007

(54) MOVABLE LENS CONTROL DEVICE

(75) Inventors: Nobuyuki Nagai, Tokyo (JP); Hiroshi Nomura, Saitama (JP); Kazunori Ishizuka, Kanagawa (JP); Toshiharu Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 41 days.

(21) Appl. No.: 11/202,088

(22) Filed: Aug. 12, 2005

(65) Prior Publication Data

US 2006/0034001 A1 Feb. 16, 2006

(30) Foreign Application Priority Data

Aug. 13, 2004 (JP) .............................. 2004-236187

(51) Int. Cl.
*G02B 15/14* (2006.01)

(52) U.S. Cl. ..................................... 359/694; 359/702

(58) Field of Classification Search .............. 359/694, 359/695, 702–704, 819–823; 396/72, 108
See application file for complete search history.

(56) References Cited

U.S. PATENT DOCUMENTS

| 5,060,001 | A | 10/1991 | Kaneda ........................ 396/81 |
|---|---|---|---|
| 5,231,441 | A | 7/1993 | Hata ........................... 396/82 |
| 5,486,888 | A | 1/1996 | Shiina et al. ................. 396/349 |
| 5,742,435 | A * | 4/1998 | Nagashima et al. ........ 359/696 |
| 6,104,549 | A * | 8/2000 | Iwasaki ....................... 359/694 |
| 6,115,552 | A | 9/2000 | Kaneda ........................ 396/82 |
| 6,624,955 | B2 | 9/2003 | Nomura et al. .............. 359/823 |
| 6,636,362 | B2 | 10/2003 | Nomura et al. .............. 359/701 |
| 6,643,074 | B2 | 11/2003 | Nomura et al. .............. 359/700 |
| 2003/0156832 | A1 | 8/2003 | Nomura et al. ............... 396/72 |
| 2004/0042089 | A1 | 3/2004 | Nomura ....................... 359/819 |
| 2004/0042090 | A1 | 3/2004 | Nomura ....................... 359/819 |
| 2004/0042091 | A1 | 3/2004 | Nomura ....................... 359/819 |
| 2004/0042092 | A1 | 3/2004 | Nomura ....................... 359/819 |

(Continued)

FOREIGN PATENT DOCUMENTS

JP 2997803 11/1999

(Continued)

OTHER PUBLICATIONS

U.S. Appl. No. 11/202,087 to Nomura, filed Aug. 12, 2005.

(Continued)

*Primary Examiner*—Mohammed Hasan
(74) *Attorney, Agent, or Firm*—Greenblum & Bernstein, P.L.C.

(57) ABSTRACT

A movable lens control device for controlling movements of movable lens groups including a first movable lens group and a second movable lens group, the movable lens control device including a lens driving device for moving the first and second movable lens groups in the optical axis direction; a position detector for detecting a position of the second movable lens group and determining whether the second movable lens group is in a predetermined normal moving range thereof; and a controller which controls operations of the lens driving device to stop the first movable lens group and to move the second movable lens group to a position within the normal moving range upon the position detector determining that the second movable lens group is positioned outside of the normal moving range during a movement of the first movable lens group from a predetermined initial position thereof.

15 Claims, 30 Drawing Sheets

U.S. PATENT DOCUMENTS

| | | | |
|---|---|---|---|
| 2004/0042093 A1 | 3/2004 | Nomura | 359/819 |
| 2004/0042095 A1 | 3/2004 | Nomura | 359/819 |
| 2004/0042096 A1 | 3/2004 | Nomura | 359/819 |
| 2004/0042775 A1 | 3/2004 | Nomura | 396/73 |
| 2004/0042776 A1 | 3/2004 | Nomura | 396/73 |
| 2004/0042777 A1 | 3/2004 | Nomura | 396/73 |
| 2004/0042778 A1 | 3/2004 | Nomura | 396/73 |
| 2004/0051967 A1 | 3/2004 | Nomura | 359/701 |
| 2004/0051968 A1 | 3/2004 | Nomura | 359/701 |
| 2004/0051969 A1 | 3/2004 | Nomura | 359/701 |
| 2004/0051970 A1 | 3/2004 | Nomura | 359/701 |
| 2004/0051971 A1 | 3/2004 | Nomura | 359/701 |
| 2004/0051972 A1 | 3/2004 | Nomura | 359/701 |
| 2004/0051981 A1 | 3/2004 | Nomura | 359/822 |
| 2004/0062536 A1 | 4/2004 | Nomura | 396/72 |
| 2004/0062537 A1 | 4/2004 | Nomura | 396/72 |
| 2004/0076418 A1 | 4/2004 | Nomura | 396/72 |
| 2004/0091253 A1 | 5/2004 | Nomura | 396/72 |
| 2004/0141735 A1 | 7/2004 | Nomura | 396/72 |
| 2004/0141736 A1 | 7/2004 | Nomura | 396/72 |
| 2004/0141737 A1 | 7/2004 | Nomura | 396/72 |
| 2004/0151490 A1 | 8/2004 | Nomura | 396/72 |
| 2005/0036777 A1 | 2/2005 | Nomura | 396/72 |
| 2005/0207748 A1 | 9/2005 | Ishizuka et al. | 396/349 |

FOREIGN PATENT DOCUMENTS

JP    2002-286999    10/2002

OTHER PUBLICATIONS

English language Abstract of JP 2002-286999.

* cited by examiner

MOVABLE LENS CONTROL DEVICE

BACKGROUND OF THE INVENTION

1. Field of the Invention

The present invention relates to a movable lens control device for controlling movements of a plurality of movable lens groups of a lens system.

2. Description of the Related Art

In retractable zoom lens barrels having a plurality of zooming lens groups (movable lens groups) which are moved to perform a zooming operation and a focusing lens group (movable lens group) positioned behind the zooming lens groups which is moved to perform a focusing operation, it is generally the case that firstly only the zooming lens groups are moved forward from respective initial positions (retracted positions) thereof with the focusing lens group remaining stationary at an initial position (retracted position) thereof, and subsequently the focusing lens group is moved forward upon the zooming lens groups reaching predetermined respective positions thereof (e.g., positions at wide-angle extremity of a zooming range) when the retractable lens barrel is extended from a retracted position to an extended position thereof.

However, there is a possibility of the focusing lens group having moved forward from the initial position unintentionally for some reason before the zooming lens groups are moved forward to respective extended positions from the initial positions. If this happens, a malfunction may occur in forward movements of the zoom lens groups toward the extended positions from the initial position.

SUMMARY OF THE INVENTION

The present invention provides a movable lens control device for controlling movements of a plurality of movable lens groups of a lens system, wherein the time required to an operation for detecting a positional error of a portion of the movable lens groups is minimized on startup of the lens system to achieve smooth movements of all the movable lens groups of the lens system.

According to the present invention, a movable lens control device is provided, for controlling movements of a plurality of movable lens groups of a photographing optical system in an optical axis direction, the plurality of movable lens groups including at least one first movable lens group and a second movable lens group, the movable lens control device including a lens driving device for moving the first movable lens group and the second movable lens group in the optical axis direction; a position detector for detecting a position of the second movable lens group and determining whether the second movable lens group is in a predetermined normal moving range thereof; and a controller which controls operations of the lens driving device to stop the first movable lens group and to move the second movable lens group to a position within the normal moving range upon the position detector determining that the second movable lens group is positioned outside of the normal moving range during a movement of the first movable lens group from a predetermined initial position thereof.

The controller can operate to resume the movement of the first movable lens group after moving the second movable lens group to the position within the normal moving range.

It is desirable for the first movable lens group to include at least one zooming lens group which is moved in the optical axis direction to perform a zooming operation, and for the second movable lens group to include at least one focusing lens group which is moved in the optical axis direction to perform a focusing operation.

It is desirable for the controller to operate to stop the zooming lens group and to move the focusing lens group to the position within the normal moving range upon the position detector determining that the focusing lens group is outside of the normal moving range at some point during the time the zooming lens group moves from the initial position to a ready-to-photograph position thereof.

It is desirable for a portion of the zooming lens group to include a radially-retractable optical element which is movable between a position on the optical axis and a radially-retracted position outside of the optical axis, and which is movable rearward in a direction parallel to the optical axis by a predetermined amount of movement when in the radially-retracted position. A lens barrel of the photographing optical system in which the zooming lens group and the focusing lens group are incorporated includes a linearly movable frame which supports the radially-retractable optical element, and is guided linearly in the optical axis direction; a rotatable member, positioned around the linearly movable frame, for moving each of a plurality of optical element support frames including the linearly movable frame which support the plurality of movable lens groups, respectively, between a ready-to-photograph position and a retracted position in the optical axis direction when the rotatable member is rotated by a rotating drive member; and a retracting member which retracts the radially-retractable optical element to the radially-retracted position from the position on the optical axis by a force produced by a relative movement between the linearly movable frame and the retracting member. The position detector determines whether the focusing lens group is in the normal moving range when the radially-retractable optical element moves forward from the predetermined initial position thereof which corresponds to a limit of rearward movement of the radially-retractable optical element in the radially-retracted position.

It is desirable for the lens barrel to include an accommodating portion formed on the rotatable member at a position thereon which coincides with both a position of the radially-retractable optical element in the optical axis direction and the radially-retracted position of the radially-retractable optical element when the linearly movable frame is in the retracted position. At least a portion of the radially-retractable optical element enters the accommodating portion of the rotatable member when the radially-retractable optical element is moved to the radially-retracted position from the position on the optical axis.

The movable lens control device can include an idle mechanism which prevents the rotating force of the rotating drive member from being transferred to the rotatable member in an initial stage of rotation of the rotating drive member in which the rotating drive member moves in the optical axis direction while rotating from a retracted position to a ready-to-photograph position thereof.

It is desirable for the second movable lens group to be a rearmost lens group among the plurality of movable lens groups.

It is desirable for the lens driving device to include a zoom motor and an AF motor for moving the zooming lens group and the focusing lens group in the optical axis direction, respectively.

It is desirable for the position within the normal moving range of the second movable lens group to correspond to a limit of rearward movement of the second movable lens group in the optical axis direction.

It is desirable for the first movable lens group to include at least two movable lens groups.

It is desirable for the lens barrel, in which the zooming lens group and the focusing lens group are incorporated, to include a retractable lens barrel.

It is desirable for the radially-retractable optical element to be rotatable about a pivot between the position on the optical axis and the radially-retracted position, the pivot being fixed to the linearly movable frame to extend parallel to the optical axis.

It is desirable for the rotatable member to include a cam ring having a plurality of cam grooves on a periphery of the cam ring, the linearly movable frame being moved in the optical axis direction by a rotation of the cam ring in accordance with contours of the plurality of cam grooves.

It is desirable for the cam ring to be movable in the optical axis direction while rotating by a rotating force of the rotating drive member.

In an embodiment, a lens system is provided, including at least one front movable lens group and a rear movable lens group which are movable in an optical axis direction, the lens system including a position detector for determining whether the rear movable lens group is positioned in a predetermined normal moving range thereof; and a lens control device which stops the front movable lens group and moves the rear movable lens group rearward into the predetermined normal moving range if the rear movable lens group is in an abnormal moving range thereof in front of the normal moving range during a forward movement of the front movable lens group from a predetermined initial position thereof.

It is desirable for the rear movable lens group to include a focusing lens group which is moved in the optical axis direction to perform a focusing operation.

It is desirable for the front movable lens group to include a least one zooming lens group which is moved in the optical axis direction to perform a zooming operation.

It is desirable for the front movable lens group to include a radially-retractable lens group which is movable between a position on the optical axis and a radially-retracted position outside of the optical axis, wherein the radially-retractable lens group is moved to the radially-retracted position while moving rearward in a direction parallel to the optical axis when the lens system changes from a ready-to-photograph state to a retracted state.

When the rear movable lens group is positioned in the predetermined normal moving range, it is desirable for the rear movable lens group not to interfere with the movement of the radially-retractable lens group between the position on the optical axis and the radially-retracted position.

According to the present invention, a movable lens control device for controlling movements of a plurality of movable lens groups of a lens system, wherein the time required to an operation for detecting a positional error of a portion of the movable lens groups is minimized on startup of the lens system to achieve smooth movements of all the movable lens groups of the lens system.

The present disclosure relates to subject matter contained in Japanese Patent Application No. 2004-236187 (filed on Aug. 13, 2004) which is expressly incorporated herein by reference in its entirety.

BRIEF DESCRIPTION OF THE DRAWINGS

The present invention will be described below in detail with reference to the accompanying drawings in which:

FIG. 31 is a flow chart showing a lens control process performed by the movable lens control system shown in FIG. 30 which starts upon a main switch being turned ON.

DESCRIPTION OF THE PREFERRED EMBODIMENT

Figure 1:
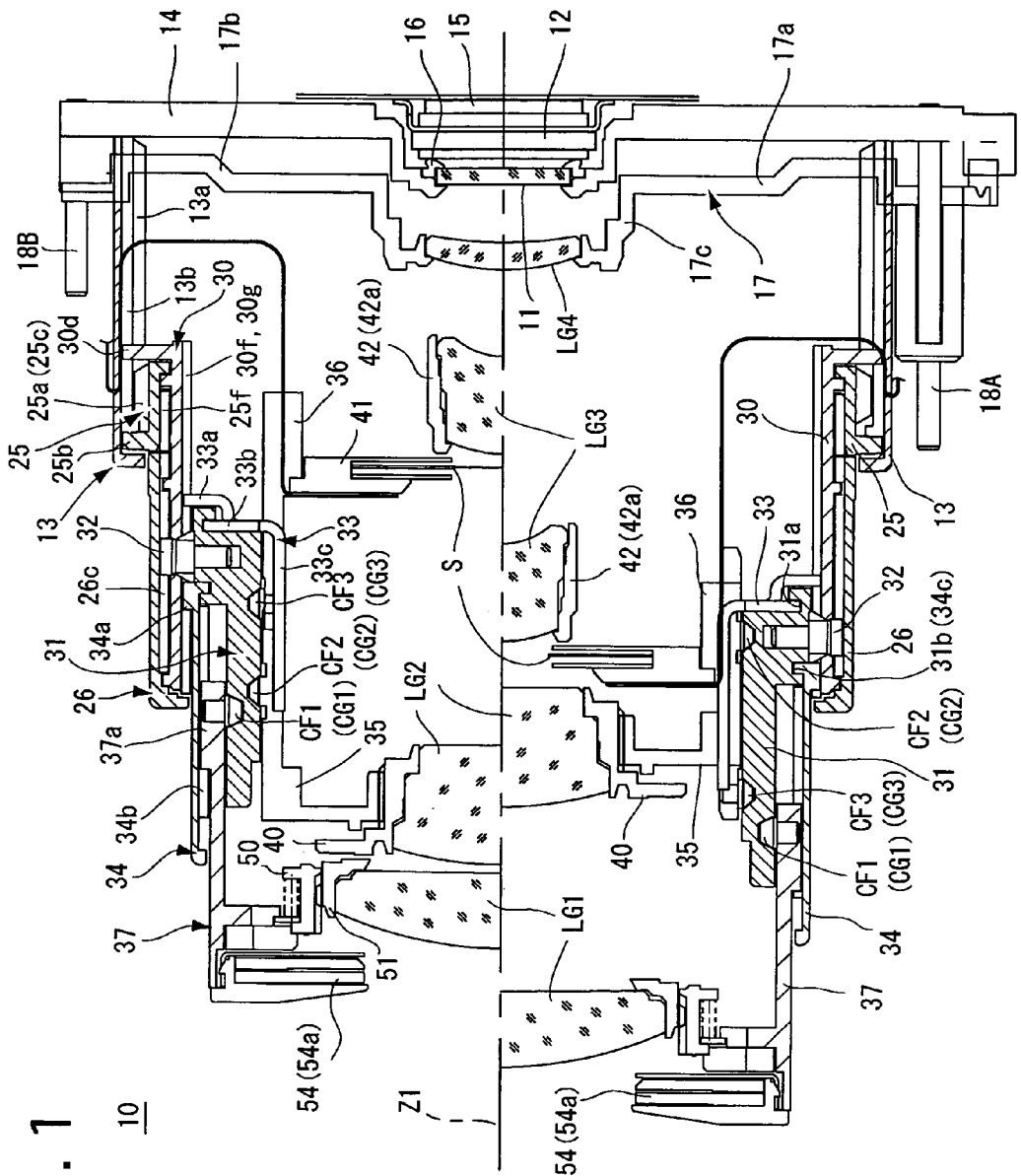
FIG. 1 is a longitudinal sectional view of an embodiment of a zoom lens according to the present invention, showing an upper half and a lower half of the zoom lens from the optical axis thereof at the wide-angle extremity and the telephoto extremity, respectively.
Figure 2:
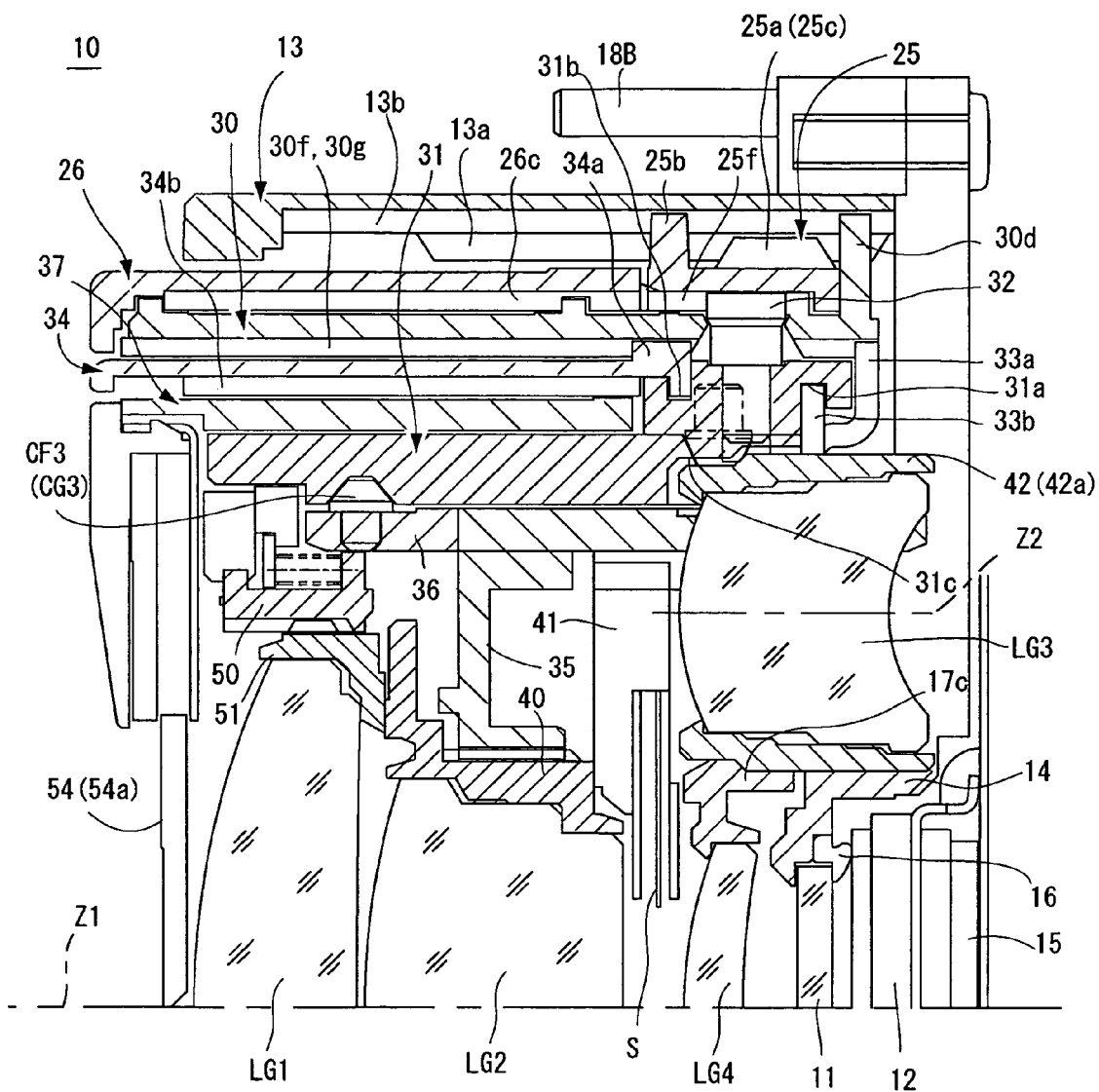
FIG. 2 is a longitudinal sectional view of the zoom lens shown in FIG. 1, showing the upper half of the zoom lens in the retracted state thereof.
Figure 3:
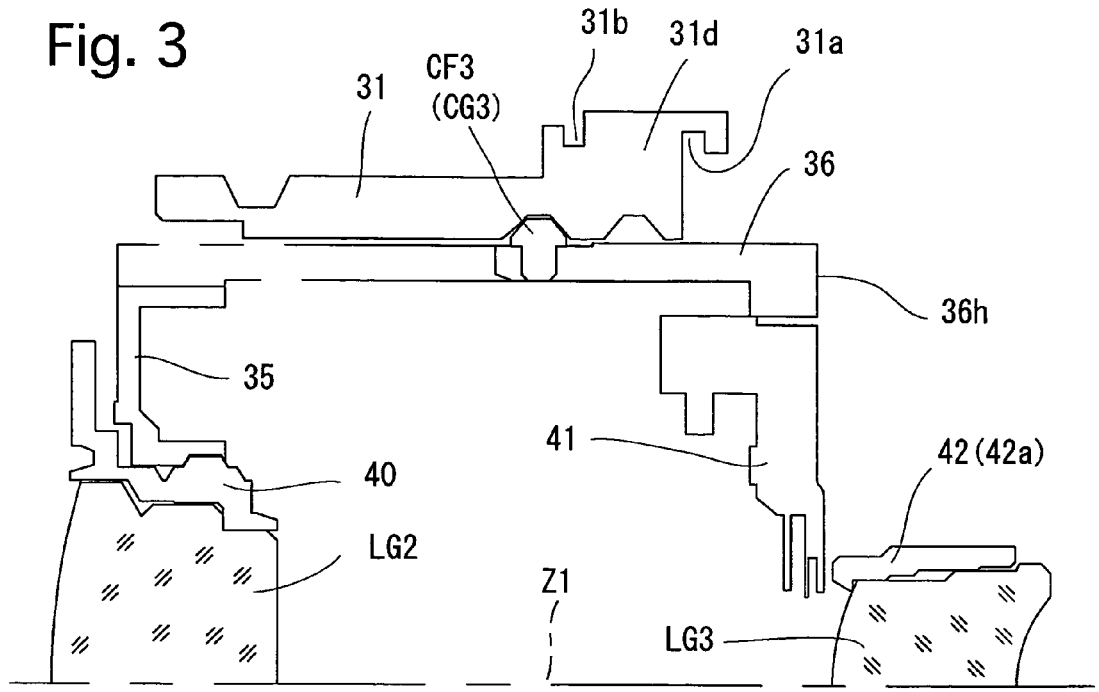
FIG. 3 is a longitudinal sectional view of a portion of a support structure which supports a second lens group and a third lens group of the zoom lens at the wide-angle extremity shown in FIG. 1.

FIGS. 1 and 2 show an embodiment of a zoom lens according to the present invention in different states. An n upper half of the zoom lens 10 from an optical axis of a photographing optical system of the zoom lens 10 shown in FIG. 1 shows a state of the zoom lens 10 at the wide-angle extremity, a lower half of the zoom lens 10 from the optical axis of the photographing optical system of the zoom lens 10 shown in FIG. 1 shows a state of the zoom lens 10 at the telephoto extremity, and FIG. 2 shows a state of the zoom lens in a retracted position (fully retracted position). The zoom lens 10 is incorporated in a digital camera (the camera body thereof is not shown in the drawings). As shown in FIG. 1, the photographing optical system of the zoom lens 10 in a ready-to-photograph state of the zoom lens 10 consists of a first lens group (first movable lens group) LG1, a second lens group (first movable lens group) LG2, a shutter S, a third lens group (first movable lens group/ radially-retractable optical element) LG3, a fourth lens group LG4 (second movable lens group), a low-pass filter (optical filter) 11, and a CCD image sensor (solid-state image pick-up device) 12. The first lens group LG1, the second lens group LG2 and the third lens group LG3 are driven along a photographing optical axis Z1 in a predetermined moving manner to perform a zooming operation, while the fourth lens group L4 is driven along the photographing optical axis Z1 to perform a focusing operation. In the following description, the term "optical axis direction" refers to a direction parallel to the photographing optical axis Z1 unless otherwise stated.

Figure 5:
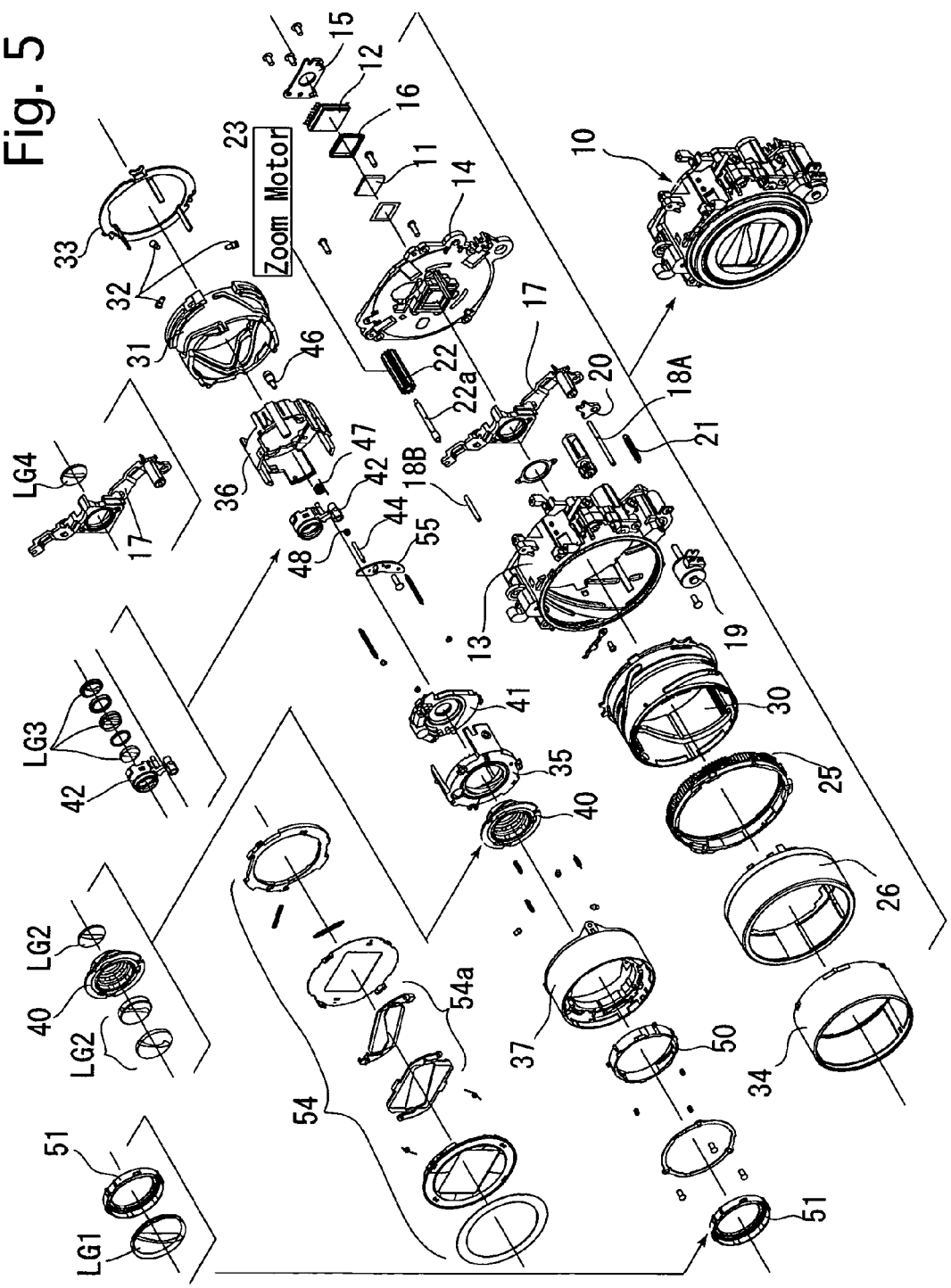
FIG. 5 is an exploded perspective view of elements of the zoom lens shown in FIGS. 1 and 2.

FIG. 5 is an exploded view of elements of the zoom lens 10, and FIGS. 6 through 11 are enlarged views of these elements. The zoom lens 10 is incorporated in a camera body (not shown), and is provided with a stationary barrel 13 fixed to the camera body. A CCD holder 14 is fixed to a rear portion of the stationary barrel 13 from behind. The CCD image sensor 12 is mounted to a central portion of the CCD holder 14 to be held thereby via a CCD base plate 15. The low-pass filter 11 is held by the CCD holder 14 to be positioned in front of the CCD image sensor 12. An annular sealing member 16 is installed between the lower-pass filter 11 and the CCD image sensor 12 to seal the gap therebetween.

The zoom lens 10 is provided in the stationary barrel 13 with an AF lens frame (a fourth lens frame which supports and holds the fourth lens group LG4) 17 which is guided linearly in the optical axis direction without rotating about the photographing optical axis Z1. Specifically, the zoom lens 10 is provided with a pair of AF guide shafts 18A and 18B which extend parallel to the photographing optical axis Z1 to guide the AF lens frame 17 in the optical axis direction without rotating the AF lens frame 17 about the photographing optical axis Z1. Front and rear ends of each guide shaft of the pair of AF guide shafts 18A and 18B are fixed to the stationary barrel 13 and the CCD holder 14, respectively. The AF lens frame 17 is provided on radially opposite sides thereof with a pair of guide holes (guide grooves) in which the pair of AF guide shafts 18A and 18B are respectively fitted so that the AF lens frame 17 is slidable on the pair of AF guide shafts 18A and 18B. Portions of the stationary barrel 13 and the CCD holder 14 which support the pair of AF guide shafts 18A and 18B project radially outwards from the outside diameter of the stationary barrel 13, and accordingly, the pair of AF guide shafts 18A and 18B are positioned radially outside of the stationary barrel 13.

The zoom lens 10 is provided therein with an AF motor (lens driving device/lens control device) 19 which is fixed to the stationary barrel 13. The AF lens frame 17 can be moved forward and rearward in the optical axis direction by a driving force of the AF motor 19. A rotary drive shaft of the AF motor 19 is threaded to serve as a feed screw shaft (rotatable lead screw), and this rotary drive shaft is screwed through a female screw hole formed on an AF nut 20 (see FIG. 6). The AF lens frame 17 is engaged with the AF nut 20 to be slidable thereon in the optical axis direction, and is biased forward in the optical axis direction by an extension coil spring (biasing member) 21, and the forward movement limit of the AF lens frame 17 is determined via the engagement between surfaces of the AF nut 20 and the AF lens frame 17 which are opposed to each other in the optical axis direction. A rearward movement of the AF nut 20 in the optical axis direction by a rotation of the rotary drive shaft of the AF motor 19 causes the AF lens frame 17 to be pressed rearward by the AF nut 20 to be moved rearward against the biasing force of the extension coil spring 21. Due to this structure, rotating the rotary drive shaft of AF motor 19 forward and rearward causes the AF lens frame 17 to move forward and rearward in the optical axis direction.

The fourth lens group LG4 is linearly movable along the photographing optical axis Z1 between a retracted position (an initial position/a position within a predetermined moving range) corresponding to the limit of rearward movement of the fourth lens group LG4 and the limit of forward movement of the fourth lens group LG4 (the fourth lens group LG4 positioned in this limit is not shown).

The zoom lens 10 is provided with a zoom gear 22 which is supported by the stationary barrel 13 to be rotatable on a zoom gear shaft 22a extending parallel to the photographing optical axis Z1. Front and rear ends of the zoom gear shaft 22a are fixed to the stationary barrel 13 and the CCD holder 14, respectively. The zoom gear 22 is positioned so that the gear teeth thereof partly project radially inwards from an inner peripheral surface of the stationary barrel 13, and can be rotated forward and reverse by a zoom motor (lens driving device/lens control device) 23 (shown conceptually by a labeled rectangle in FIGS. 5 and 30). The zoom motor 23 is a stepper motor.

Figure 6:
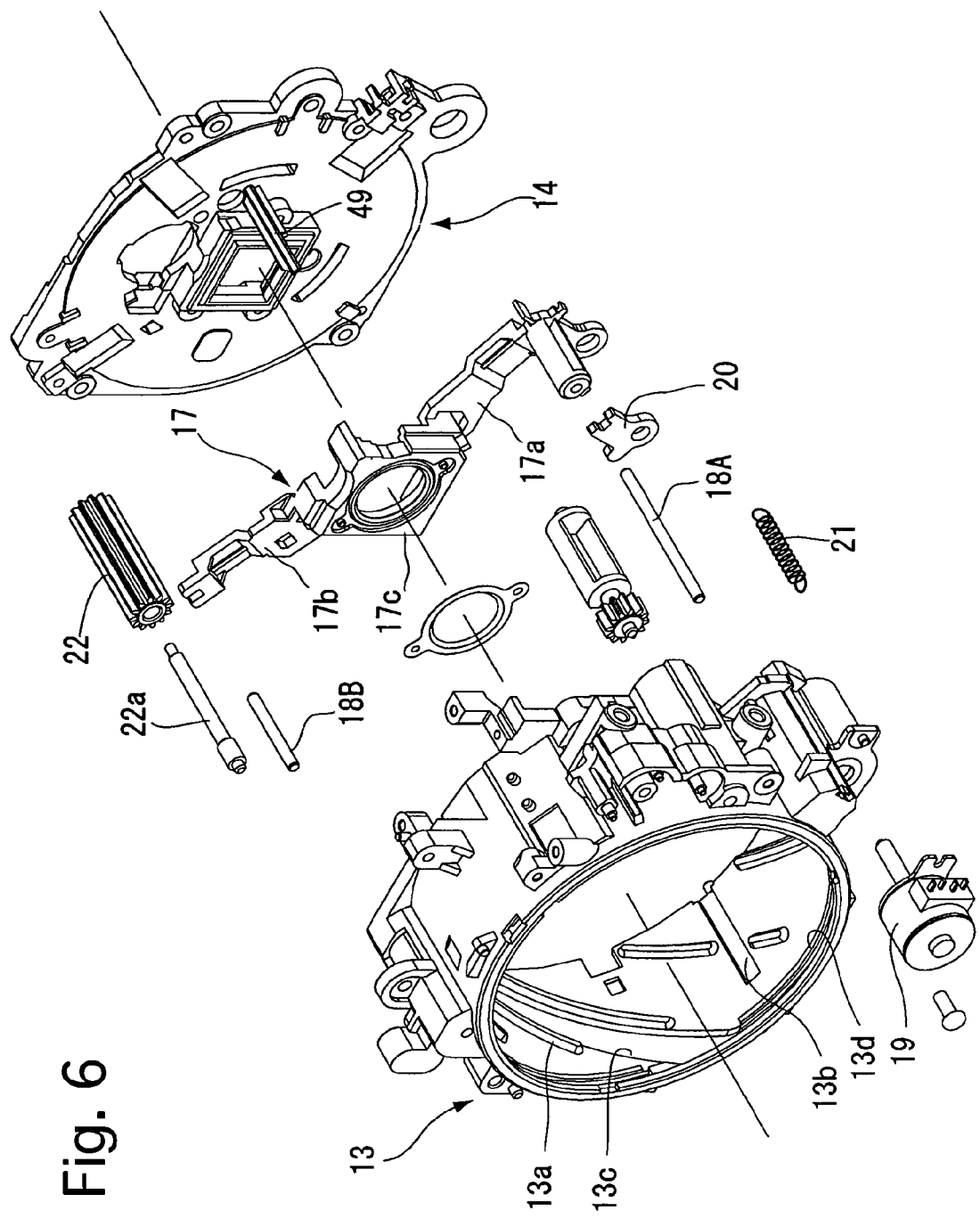
FIG. 6 is an exploded perspective view of a CCD holder, a stationary barrel and other elements of the zoom lens shown in FIGS. 1 and 2.

As shown in FIG. 6, the stationary barrel 13 is provided on an inner peripheral surface thereof with a female helicoid 13a, a set of three linear guide grooves 13b, a set of three inclined grooves 13c, and a set of three rotational guide grooves 13d. Threads of the female helicoid 13a extend in a direction inclined with respect to both the optical axis direction and a circumferential direction of the stationary barrel 13. The set of three linear guide grooves 13b extend parallel to the photographing optical axis Z1. The set of three inclined grooves 13c extend parallel to the female helicoid 13a. The set of three rotational guide grooves 13d are formed in the vicinity of a front end of the inner peripheral surface of the stationary barrel 13 to extend along a circumference of the stationary barrel 13 to communicate the front ends of the set of three inclined grooves 13c, respectively. The female helicoid 13a is not formed on a specific front area of the inner peripheral surface of the stationary barrel 13 which is positioned immediately behind the set of three rotational guide grooves 13d. Regarding each set of the above three sets of grooves (the set of three linear guide grooves 13b, the set of three inclined grooves 13c and the set of three rotational guide grooves 13d), although each set of grooves is composed of three grooves which are arranged at different circumferential positions on the inner peripheral surface of the stationary lens barrel 13, only some of the three grooves appear in FIG. 6.

The zoom lens 10 is provided inside the stationary barrel 13 with a helicoid ring (rotating drive member) 25. The helicoid ring 25 is provided on an outer peripheral surface thereof with a male helicoid 25a and a set of three rotational guide projections 25b. The male helicoid 25a is engaged with the female helicoid 13a, and the set of three rotational guide projections 25b are engaged in the set of three inclined grooves 13c or the set of three rotational guide grooves 13d, respectively. The helicoid ring 25 is provided on threads of the male helicoid 25a with an annular gear 25c which is in mesh with the zoom gear 22. Therefore, when a rotation of the zoom gear 22 is transferred to the annular gear 25c, the helicoid ring 25 moves forward or rearward in the optical axis direction while rotating about the photographing optical axis Z1 within a predetermined range in which the male helicoid 25a remains in mesh with the female helicoid 13a. A forward movement of the helicoid ring 25 beyond a predetermined point with respect to the stationary barrel 13 causes the male helicoid 25a to be disengaged from the female helicoid 13a so that the helicoid ring 25 rotates about the photographing optical axis Z1 without moving in the optical axis direction relative to the stationary barrel 13 by engagement of the set of three rotational guide projections 25b with the set of three rotational guide grooves 13d. In a state where the female helicoid 13a is in mesh with the male helicoid 25a, the set of three rotational guide projections 25b are positioned in the set of three inclined grooves 13c, respectively, and accordingly, the set of three rotational guide projections 25b and the female helicoid 13a do not interfere with each other.

As can be appreciated from FIGS. 1 and 2, the zoom lens 10 is a telescopic type having three external telescoping barrels: a first external barrel (optical element support frame) 37, a second external barrel 34 and a third external barrel (rotating drive member) 26, which are concentrically arranged about the photographing optical axis Z1. The helicoid ring 25 moves together with the third external barrel 26 in the optical axis direction while rotating about the photographing optical axis Z1. The helicoid ring 25 is provided, on an inner peripheral surface thereof at three different circumferential positions on the helicoid ring 25, with three rotation transfer recesses (engaging recesses) 25d, the front ends of which are open at the front end of the helicoid ring 25. The third external barrel 26 is provided, at corresponding three different circumferential positions on the third external barrel 26, with three pairs of rotation transfer projections (engaging projections) 26a which project rearward from the rear end of the third external barrel 26 to be engageable in the three rotation transfer recesses 25d from the front thereof, respectively (see FIG. 13). The three pairs of rotation transfer projections 26a and the three rotation transfer recesses 25d are movable relative to each other in the direction of the photographing optical axis Z1, and are not rotatable relative to each other about the photographing optical axis Z1. Namely, the helicoid ring 25 and the third external barrel 26 rotate integrally. The helicoid ring 25 is provided, on front faces of the three rotational guide projections 25b at three different circumferential positions on the helicoid ring 25, with a set of three engaging recesses 25e which are formed on an inner peripheral surface of the helicoid ring 25 to be open at the front end of the helicoid ring 25. The third external barrel 26 is provided, at corresponding three different circumferential positions on the third external barrel 26, with a set of three engaging projections 26b which project rearward from the rear end of the third external barrel 26, and which also project radially outwards, to be engaged in the set of three engaging recesses 25e from the front thereof, respectively. The set of three engaging projections 26b, which are respectively engaged in the set of three engaging recesses 25e, are also engaged in the set of three rotational guide grooves 13d at a time, respectively, when the set of three rotational guide projections 25b are engaged in the set of three rotational guide grooves 13d.

The third external barrel 26 and the helicoid ring 25 are biased in opposite directions away from each other in the optical axis direction by compression coil springs (not shown). These compression coil springs are installed between the third external barrel 26 and the helicoid ring 25 in a compressed fashion. Therefore, the set of three engaging projections 26b of the third external barrel 26 are respectively pressed against front guide surfaces of the rotational guide grooves 13d therein by the spring force of the compression coil springs. At the same time, the set of three rotational guide projections 25b of the helicoid ring 25 are respectively pressed against rear guide surfaces of the rotational guide grooves 13d therein by the spring force of the compression coil springs.

Figure 13:
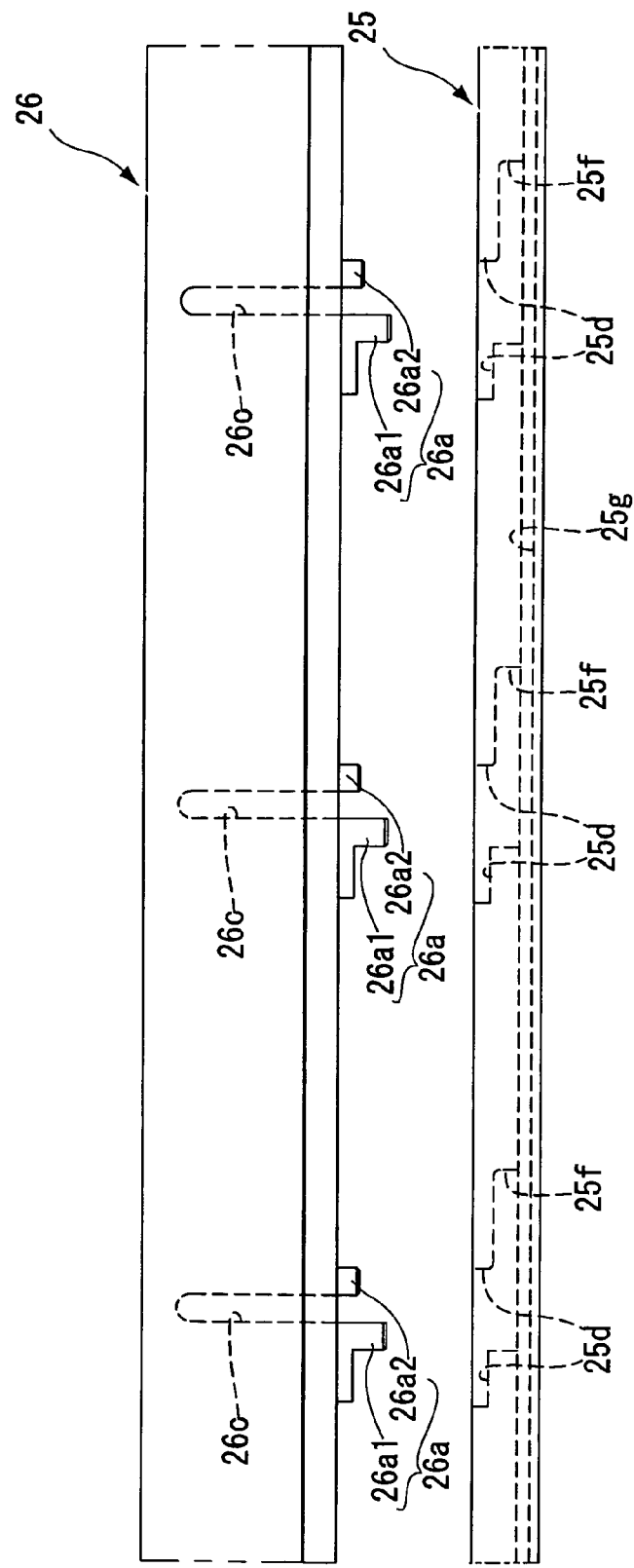
FIG. 13 is a developed view of the helicoid ring and the third external barrel which are shown in FIG. 7.
Figure 18:
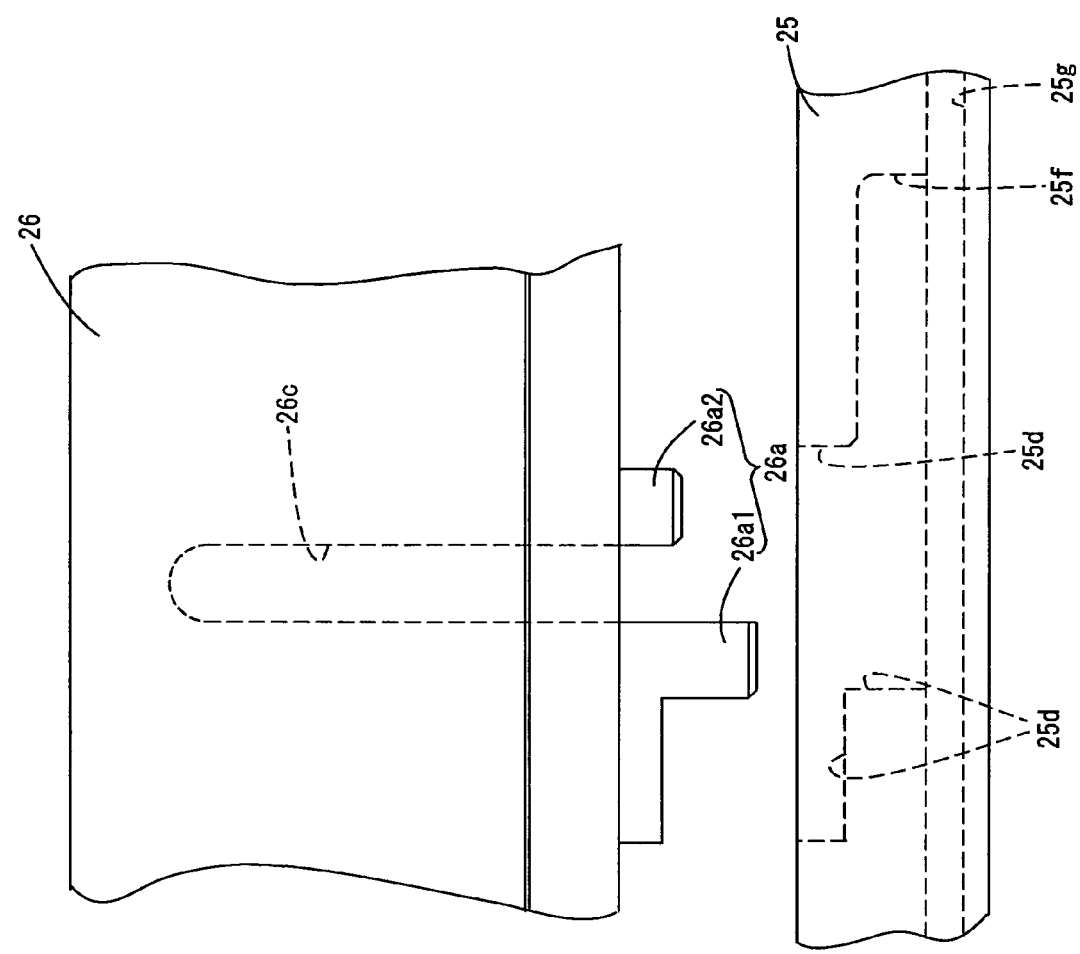
FIG. 18 is a developed view of portions of the helicoid ring and the third external barrel, showing the positional relationship between an engaging recess of the helicoid ring and engaging projections of the third external barrel.
Figure 19:
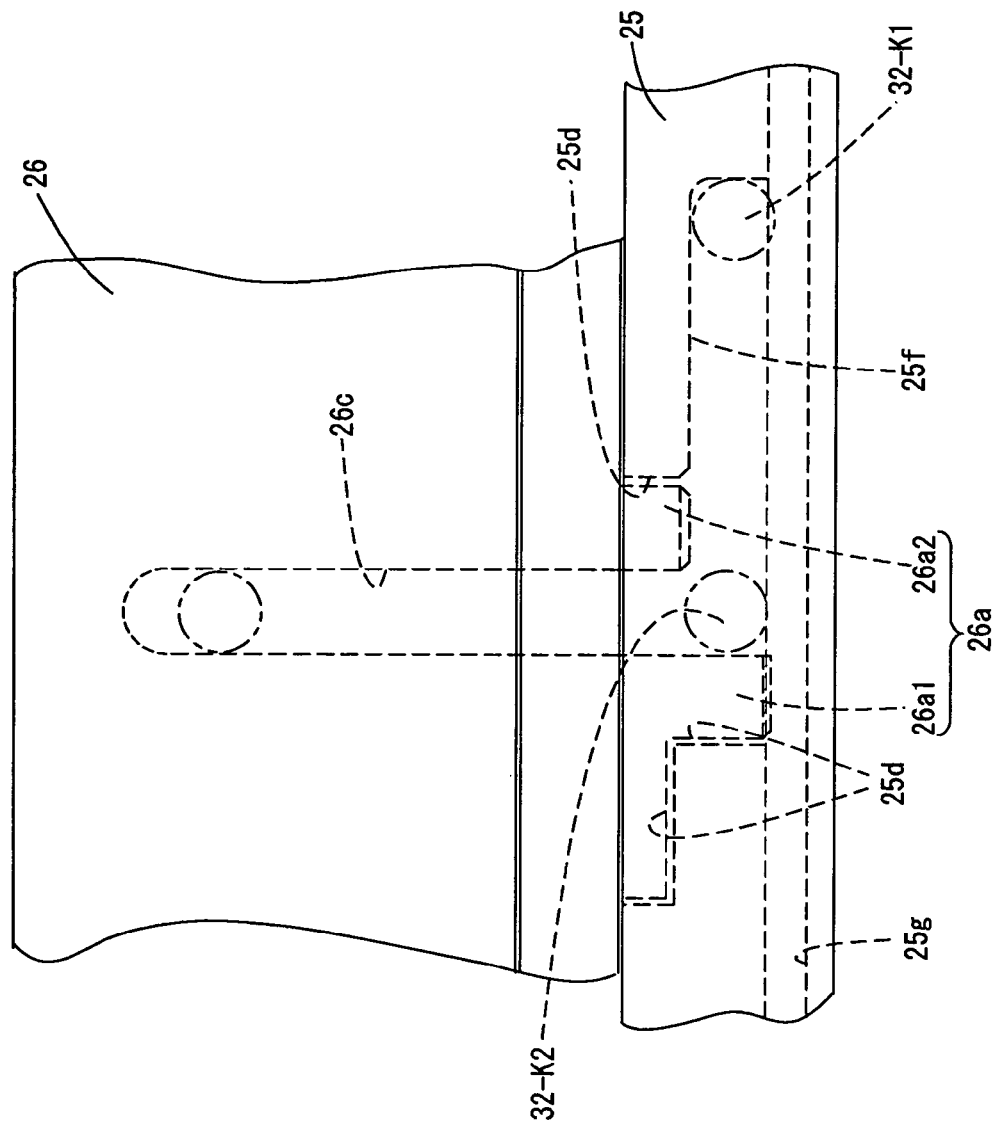
FIG. 19 is a view similar to that of FIG. 18, showing a state of engagement of the engaging recess of the helicoid ring with the engaging projections of the third external barrel.

As shown in FIG. 13, the third external barrel 26 is provided on an inner peripheral surface thereof with a set of three rotation transfer grooves 26c which extend parallel to the photographing optical axis Z1. The front end of each rotation transfer groove 26c is closed at the front end of the third external barrel 26, and the rear end of each rotation transfer groove 26c is open at the rear end of the third external barrel 26. The circumferential positions of the three rotation transfer grooves 26c correspond to those of the three pairs of rotation transfer projections 26a, respectively. More specifically, as shown in FIGS. 13, 18 and 19, each pair of rotation transfer projections 26a consists of a long projection 26a1 and a short projection 26a2 which is smaller than the long projection 26a1 in the amount of projection rearward in the optical axis direction, and the rear end opening of the associated rotation transfer groove 26c is positioned between the long projection 26a1 and the short projection 26a2, and accordingly, surfaces of the long projection 26a1 and the short projection 26a2 which are opposed to each other in a circumferential direction of the third external barrel 26 form a part (the rear end opening) of the associated rotation transfer groove 26c.

On the other hand, the helicoid ring 25 is provided on an inner peripheral surface thereof with a set of three relative rotation allowing grooves (elements of an idle mechanism) 25f which are communicatively connected with the three rotation transfer recesses 25d, respectively. The three relative rotation allowing grooves 25f extend circumferentially on a circle about the photographing optical axis Z1, and one end (left end as viewed in FIG. 13) of each relative rotation allowing groove 25f is communicatively connected with the associated rotation transfer recess 25d, and the other end (right end as viewed in FIG. 13) of each relative rotation allowing groove 25f is formed as a closed end. In a state where the helicoid ring 25 and the third external barrel 26 are coupled to each other, each relative rotation allowing groove 25f is communicatively connected with the rear end opening (the right side surface of the associated long projection 26a1 as viewed in FIG. 19) of the associated rotation transfer groove 26c so that the relative rotation allowing groove 25f and the rotation transfer groove 26c together form an L-shaped groove as shown in FIG. 19.

Figure 7:
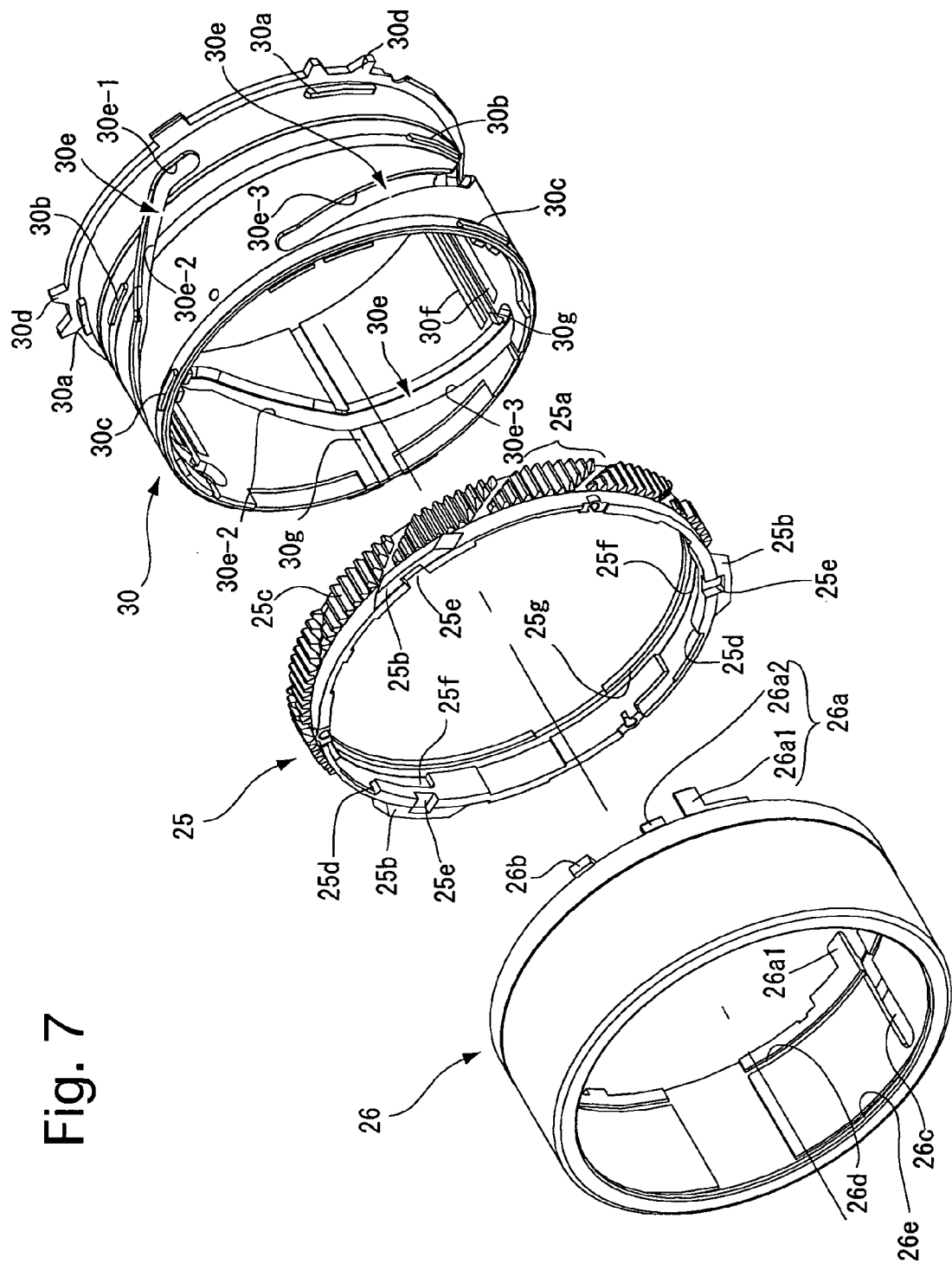
FIG. 7 is an exploded perspective view of a first linear guide ring, a helicoid ring and a third external barrel of the zoom lens shown in FIGS. 1 and 2.
Figure 12:
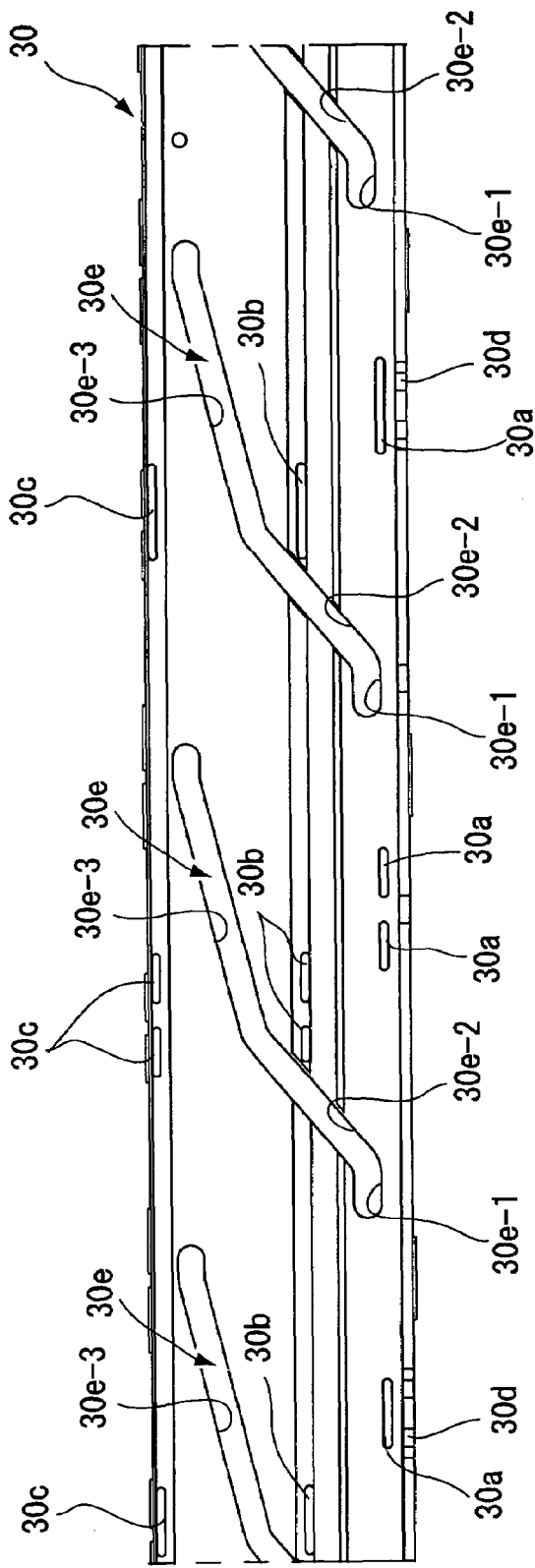
FIG. 12 is a developed view of the first linear guide ring shown in FIG. 7.

The zoom lens 10 is provided inside of the third external barrel 26 and the helicoid ring 25 with a first linear guide ring 30. The helicoid ring 25 is provided on an inner peripheral surface thereof with a circumferential groove 25g which extends in a circumferential direction about the photographing optical axis Z1, and the third external barrel 26 is provided, on an inner peripheral surface thereof in the vicinity of the rear end and the front end of the third external barrel 26, with a rear circumferential groove 26d and a front circumferential groove 26e, respectively, each of which extends in a circumferential direction about the photographing optical axis Z1 (see FIG. 7). As shown in FIGS. 7 and 12, the first linear guide ring 30 is provided on an outer peripheral surface thereof with a first plurality of relative rotation guide projections 30a, a second plurality of relative rotation guide projections 30b and a third plurality of relative rotation guide projections 30c, in that order from the rear of the first linear guide ring 30 in the optical axis direction. The first plurality of relative rotation guide projections 30a, the second plurality of relative rotation guide projections 30b and the third plurality of relative rotation guide projections 30c are engaged in the circumferential groove 25g, the rear circumferential groove 26d and the front circumferential groove 26e, respectively. Due to this engagement, the helicoid ring 25 and the third external barrel 26 are supported by the first linear guide ring 30 to be allowed to rotate relative to the first linear guide ring 30 and to be prevented from moving in the optical axis direction relative to the first linear guide ring 30. In addition, the helicoid ring 25 and the third external barrel 26 are prevented from being separated totally from each other in the optical axis direction via the first linear guide ring 30. The first linear guide ring 30 is provided, in the vicinity of the rear end thereof at different circumferential positions, with a set of three linear guide projections 30d which project radially outwards. The first linear guide ring 30 is guided linearly in the optical axis direction without rotating by the engagement of the set of three linear guide projections 30d with the set of three linear guide grooves 13b of the stationary barrel 13.

The first linear guide ring 30 is provided with a set of three through slots (through grooves) 30e which radially extend through the first linear guide ring 30. As shown in FIG. 12, each through slot 30e includes a circumferential slot portion (an element of an idle mechanism/a rotational direction groove portion) 30e-1 which extends in a circumferential direction of the first linear guide ring 30, a first lead slot portion (an inclined groove portion) 30e-2 which extends obliquely from one end (right end as viewed in FIG. 12) of the circumferential slot portion 30e-1, and a second lead slot portion (an inclined groove portion) 30e-3 which extends obliquely from one end (right end as viewed in FIG. 12) of the first lead slot portion 30e-2. The angle of inclination of the first lead slot portion 30e-2 relative to the circumferential direction of the first linear guide ring 30 is greater than that of the second lead slot portion 30e-3. The zoom lens 10 is provided with a cam ring (rotatable member) 31 a front part of which is fitted in the first external barrel 37. A set of three roller followers (rotation transfer projections/elements of the idle mechanism) 32 fixed to an outer peripheral surface of the cam ring 31 at different circumferential positions thereon are engaged in the set of three through slots 30e, respectively. The set of three roller followers 32 are further engaged in the set of three rotation transfer grooves 26c (or the set of three relative rotation allowing grooves 25f) through the set of three through slots 30e, respectively.

Advancing operations of movable elements of the zoom lens 10 from the stationary barrel 13 to the cam ring 31 will be discussed hereinafter. Rotating the zoom gear 22 in a lens barrel advancing direction by the zoom motor 23 causes the helicoid ring 25 to move forward while rotating due to engagement of the female helicoid 13a with the male helicoid 25a. This rotation of the helicoid ring 25 causes the third external barrel 26 to move forward together with the helicoid ring 25 while rotating together with the helicoid ring 25, and further causes the first linear guide ring 30 to move forward together with the helicoid ring 25 and the third external barrel 26 because each of the helicoid ring 25 and the third external barrel 26 is coupled to the first linear guide ring 30, to allow respective relative rotations between the third external barrel 26 and the first linear guide ring 30 and between the helicoid ring 25 and the first linear guide ring 30 and to be movable together along a direction of a common rotational axis (i.e., the photographing optical axis Z1), due to the engagement of the first plurality of relative rotation guide projections 30a with the circumferential groove 25g, the engagement of the second plurality of relative rotation guide projections 30b with the rear circumferential groove 26d, and the engagement of the third plurality of relative rotation guide projections 30c with the front circumferential groove 26e.

Figure 14:
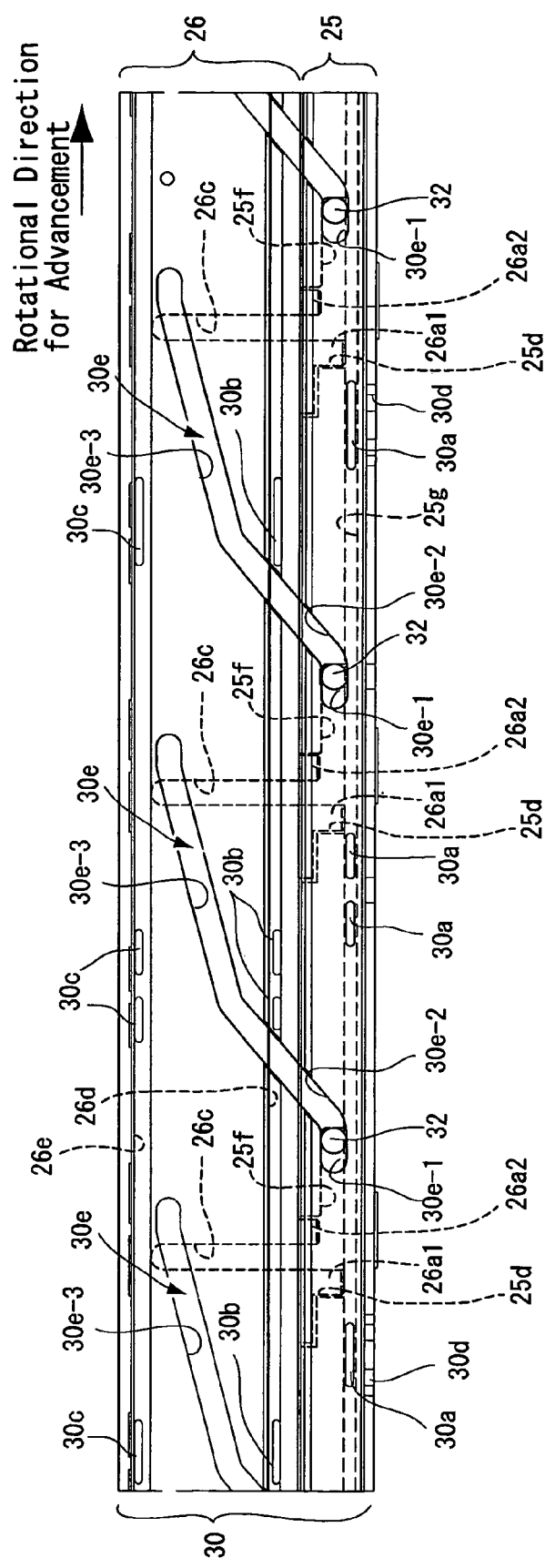
FIG. 14 is a developed view of a set of roller followers fixed to the cam ring, the first linear guide ring, the helicoid ring and the third external barrel, showing the positional relationship thereamong in the retracted state of the zoom lens.
Figure 16:
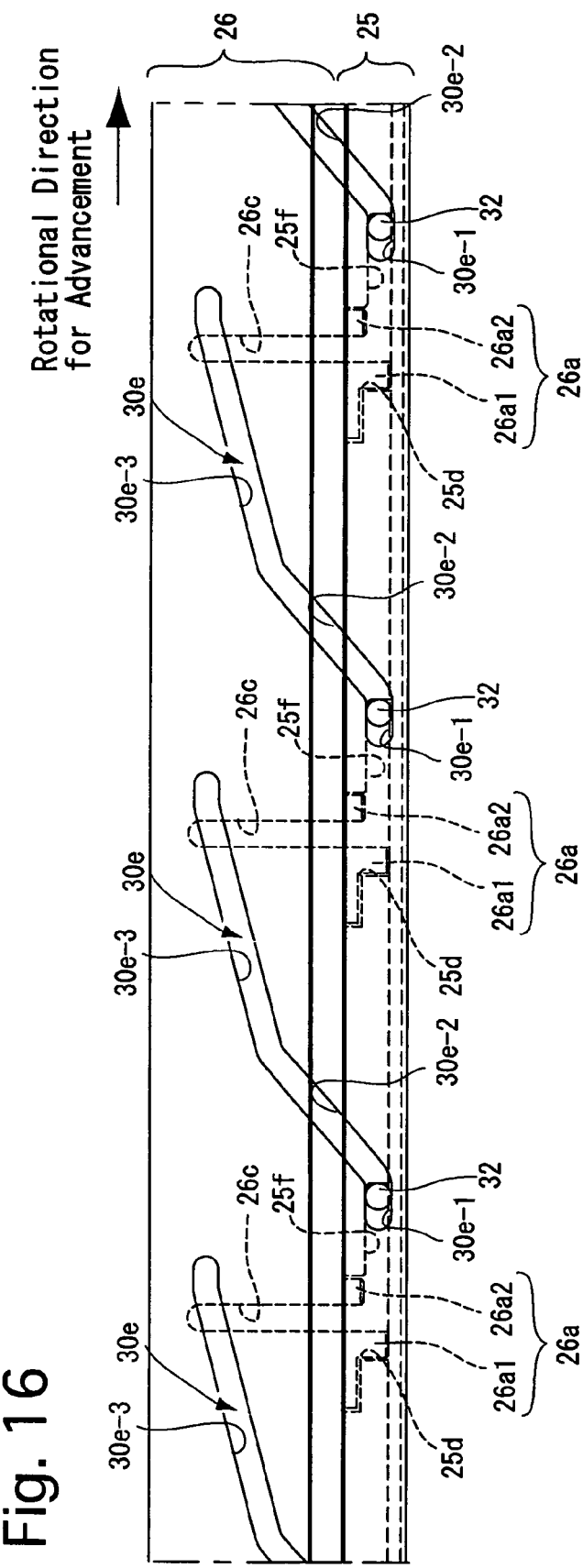
FIG. 16 is a view similar to that of FIG. 14, showing a state where the first linear guide ring has been removed.

In the retracted state of the zoom lens 10, the set of three roller followers 32 are engaged in the circumferential slot portions 30e-1 of the set of three through slots 30e, respectively, and are further engaged in the three relative rotation allowing grooves 25f at closed end portions 32-K1 thereof (see FIG. 19), respectively, as shown in FIGS. 14 and 16.

FIGS. 14 and 16 show the same states, although the first linear guide ring 30 is removed in FIG. 16 except the set of three through slots 30e for the purpose of making the operation of each roller follower 32 easier to be seen in the drawing. In addition, in FIGS. 14 and 16, the first linear guide ring 30 (the set of three through slots 30e) are shown by solid lines though actually positioned a hidden position below (radially inside) the helicoid ring 25 and the third external barrel 26.

When the helicoid ring 25 and the third external barrel 26 are moved forward while rotating, this rotation of the helicoid ring 25 and the third external barrel 26 is not transferred to the cam ring 31 in an initial stage of the forward movement of the helicoid ring 25 and the third external barrel 26 because the set of three roller followers 32 are engaged in the set of three relative rotation allowing grooves 25f, respectively. The set of three roller followers 32 move together with the helicoid ring 25, the third external barrel 26 and the first linear guide ring 30 in the optical axis direction due to the engagement of the set of three roller followers 32 with the circumferential slot portions 30e-1 of the set of three through slots 30e, respectively. Accordingly, in an initial stage of the advancing operation of the zoom lens 10 from the retracted state of the zoom lens 10, the cam ring 31 is moved forward in the optical axis direction without rotating.

Figure 15:
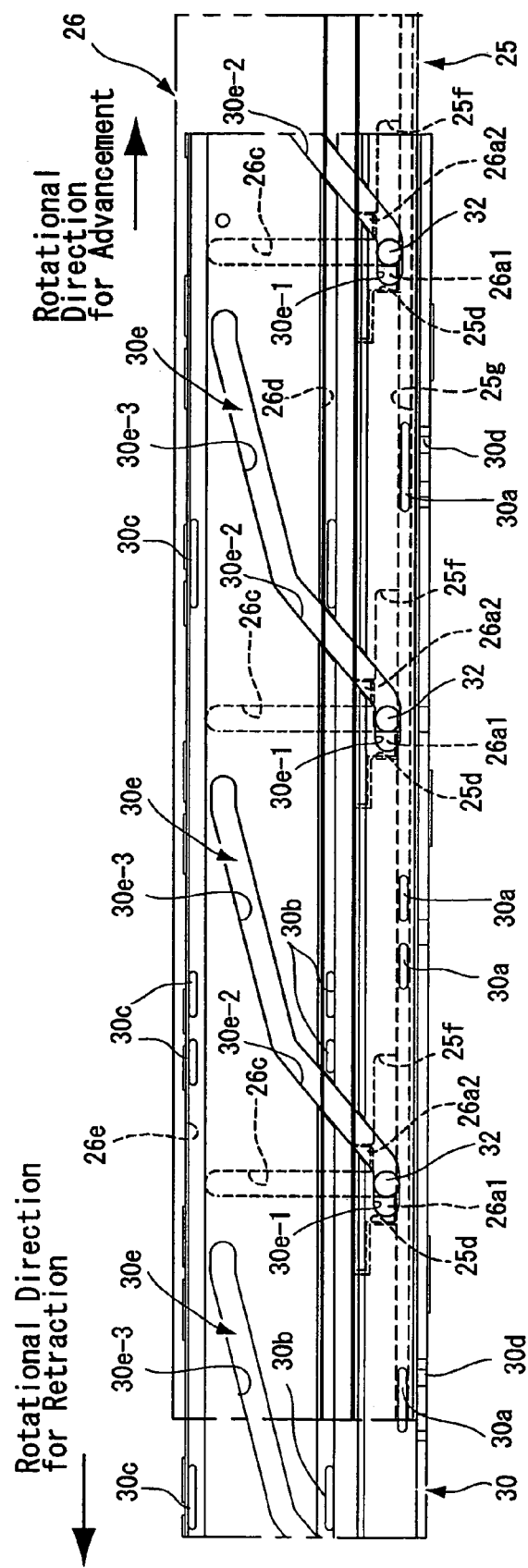
FIG. 15 is a view similar to that of FIG. 14, showing the positional relationship among the set of roller followers, the first linear guide ring, the helicoid ring and the third external barrel, in a state where the third external barrel has been slightly extended forward from the retracted state of the zoom lens.
Figure 17:
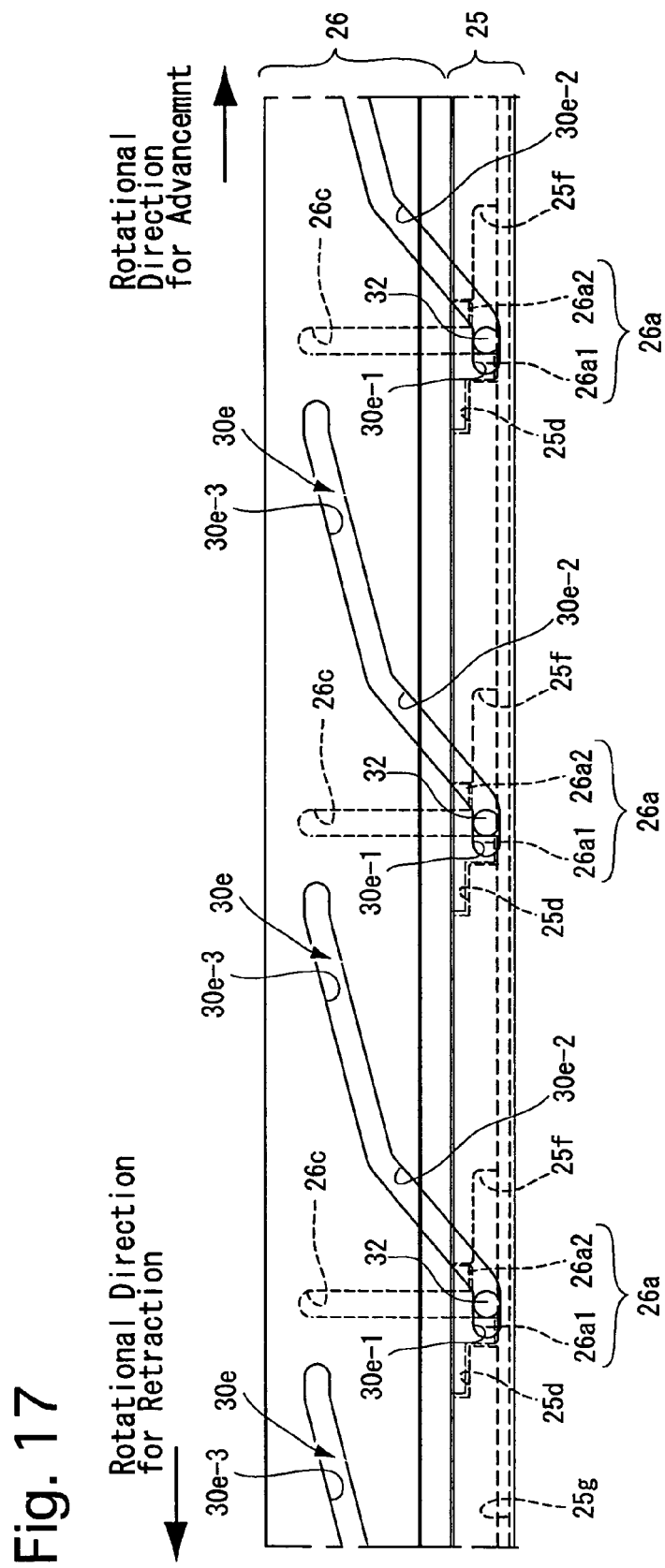
FIG. 17 is a view similar to that of FIG. 15, showing a state where the first linear guide ring has been removed.

FIGS. 15 and 17 show a state of the helicoid ring 25 and the third external barrel 26 which have been rotated by an angle of approximately 30 degrees from their respective retracted positions from the retracted state of the zoom lens 10 shown in FIGS. 14 and 16. In the state shown in FIGS. 15 and 17, each roller follower 32 is engaged in an intersection 32-K2 (see FIG. 19) of the associated relative rotation allowing groove 25f and the associated rotation transfer groove 26c so that the rotation of the helicoid ring 25 and the third external barrel 26 can be transferred to the roller follower 32 via a side surface (left surface as viewed in FIG. 19) of the rotation transfer groove 26c at the left end of the relative rotation allowing groove 25f. A further forward movement of the helicoid ring 25 and the third external barrel 26 while rotating causes each roller follower 32 to be moved rightward as viewed in FIGS. 15 and 17 from the circumferential slot portions 30e-1 to the first lead slot portion 30e-2 of the associated through slot 30e. Since the first lead slot portion 30e-2 of each through slot 30e is inclined to the circumferential direction of the first linear guide ring 30 in a manner to approach the front end (upper end as viewed in FIG. 15) of the first linear guide ring 30 in a direction away from the circumferential slot portions 30e-1 of the associated through slot 30e, a forward movement of each roller follower 32 in the first lead slot portion 30e-2 of the associated through slot 30e causes the roller follower 32 to be disengaged from the associated relative rotation allowing groove 25f to be engaged in the associated rotation transfer groove 26c (i.e., the roller follower 32 is led from the associated relative rotation allowing groove 25f to the associated rotation transfer groove 26c). In a state where the set of three roller followers 32 are engaged in the set of three rotation transfer grooves 26c, respectively, the torque (rotating force) of the third external barrel 26 is transferred to the cam ring 31 via the engagement of the set of three roller followers 32 with the set of three rotation transfer grooves 26c whenever the third external barrel 26 rotates. Thereupon, the cam ring 31 moves forward while rotating relative to the first linear guide ring 30 in accordance with contours of the first lead slot portions 30e-2 of the set of three through slots 30e. At this time, each roller follower 32 moves forward in the optical axis direction in the associated rotation transfer groove 26c while receiving a torque from the same rotation transfer groove 26c. Since the first linear guide ring 30 itself has linearly moved forward together with the helicoid ring 25 and the third external barrel 26 as described above, the cam ring 31 moves forward in the optical axis direction by a resultant amount of movement corresponding to the sum of the amount of the forward movement of the first linear guide ring 30 (and the helicoid ring 25 and the third external barrel 26) and the amount of the forward movement of the cam ring 31 via the engagement of the set of three roller followers 32 with the first lead slot portions 30e-2 of the set of three through slots 30e, respectively.

The above described rotating-advancing operations of the helicoid ring 25 and the third external barrel 26 are performed only when the male helicoid 25a and the female helicoid 13a are engaged with each other. At this time, the set of three rotational guide projections 25b are moving in the set of three inclined grooves 13c, respectively. When the helicoid ring 25 is moved forward by a predetermined amount of movement, the male helicoid 25a and the female helicoid 13a are disengaged from each other so that the set of three rotational guide projections 25b move from the set of three inclined grooves 13c into the set of three rotational guide grooves 13d, respectively. Since the helicoid ring 25 does not move in the optical axis direction relative to the stationary barrel 13 even if rotating upon the disengagement of the male helicoid 25a from the female helicoid 13a, the helicoid ring 25 and the third external barrel 26 rotate at respective axial fixed positions thereof without moving in the optical axis direction due to the slidable engagement of the set of three rotational guide projections 25b with the set of three rotational guide grooves 13d.

Furthermore, after a lapse of a predetermined period of time from the moment at which the set of three rotational guide projections 25b slide into the set of three rotational guide grooves 13d from the set of three inclined grooves 13c, respectively, the set of three roller followers 32 enter the second lead slot portions 30e-3 from the first lead slot portions 30e-2 of the set of three through slots 30e, respectively. Since the second lead slot portion 30e-3 of each through slot 30e is inclined to the first linear guide ring 30 in a direction away from the associated first lead slot portion 30e-2 and approaching the front end (upper end as viewed in FIG. 15) of the first linear guide ring 30, further rotation of the helicoid ring 25 and the third external barrel 26 at respective axial fixed positions thereof in a lens barrel advancing direction causes each roller follower 32 to move forward in the second lead slot portion 30e-3 of the associated through slot 30e. Namely, the cam ring 31 is moved forward while rotating relative to the first linear guide ring 30 in accordance with contours of the second lead slot portions 30e-3 of the set of three through slots 30e. The helicoid ring 25 and the third external barrel 26 serve as a rotating drive member which transfers torque to the cam ring 31 via the engagement of the set of three roller followers 32 with the set of three through slots 30e and the engagement of the set of three roller followers 32 with the set of three rotation transfer grooves 26c.

Rotating the zoom gear 22 in a lens barrel retracting direction thereof via the zoom motor 23 causes the aforementioned movable elements of the zoom lens 10 from the stationary barrel 13 to the cam ring 31 to operate in the reverse manner to the above described advancing operations. In this reverse operation, the helicoid ring 25 and the third external barrel 26 which rotate at respective axial fixed positions thereof move rearward in the optical axis direction while rotating after the male helicoid 25a and the female helicoid 13a are engaged with each other. The first linear guide ring 30 linearly moves in the optical axis direction without rotating at all times while following the rearward linear movement of the helicoid ring 25 and the third external barrel 26. When the set of three roller followers 32 are engaged in the first lead slot portions 30e-2 or the second lead slot portions 32e-3 of the set of three through slots 30e, respectively, the cam ring 31 moves rearward in the optical axis direction relative to the helicoid 25, the third external barrel 26 and the first linear guide ring 30 by rotation of the helicoid ring 25 and the third external barrel 26 in the lens barrel retracting direction thereof. At this time, each roller follower 32 moves rearward in the optical axis direction in the associated rotation transfer groove 26c while receiving a torque from the same rotation transfer groove 26c. Thereafter, upon moving into the circumferential slot portions 30e-1 from the first lead slot portion 30e-2 of the associated through slot 30e, each roller follower 32 is disengaged from the associated rotation transfer groove 26c at the rear opening end thereof to be engaged in the associated relative rotation allowing groove 25f. At this time, the rotation of the helicoid ring 25 and the third external barrel 26 stops being transferred to the set of three roller followers 32, and accordingly, the cam ring 31 is moved rearward in the optical axis direction without rotating together with the helicoid ring 25, the third external barrel 26 and the first linear guide ring 30. Each roller follower 32 moves in the associated relative rotation allowing groove 25f, and the zoom lens 10 falls into the retracted position thereof upon each roller follower 32 reaching the closed end (right end as viewed in FIG. 13) of the associated relative rotation allowing groove 25f.

The structure of the zoom lens 10 radially inside of the cam ring 31 will be discussed hereinafter. As shown in FIG. 7, the first linear guide ring 30 is provided on an inner peripheral surface thereof with a set of three pairs of first linear guide grooves 30f which are formed at different circumferential positions to extend parallel to the photographing optical axis Z1, and a set of six second linear guide grooves 30g which are formed at different circumferential positions to extend parallel to the photographing optical axis Z1. Each pair of first linear guide grooves 30f are respectively positioned on the opposite sides of the associated second linear guide groove 30g (every second linear guide groove 30g) in a circumferential direction of the first linear guide ring 30. The zoom lens 10 is provided inside of the first linear guide ring 30 with a second linear guide ring 33. The second linear guide ring 33 is provided on an outer edge thereof with a set of three bifurcated projections 33a (see FIG. 8) which project radially outwards from a ring portion 33b of the second linear guide ring 33. Each bifurcated projection 33a is provided at a radially outer end thereof with a pair of radial projections which are respectively engaged in the associated pair of first linear guide grooves 30f. On the other hand, a set of six radial projections 34a (see FIG. 11) which are formed on an outer peripheral surface of the second external barrel 34 at a rear end thereof and project radially outwards are engaged in the set of six second linear guide grooves 30g to be slidable therealong, respectively. Therefore, each of the second linear guide ring 33 and the set of six radial projections 34a of the second external barrel 34 is guided in the optical axis direction via the first linear guide ring 30. The zoom lens 10 is provided inside of the cam ring 31 with a second lens group moving frame (optical element support frame) 35 which indirectly supports and holds the second lens group LG2. The first external barrel 37 indirectly supports the first lens group LG1, and is positioned inside of the second external barrel 34. The zoom lens 10 is provided radially inside of the cam ring 31 with a third lens group moving frame (linearly movable frame/optical element support frame) 36. The second linear guide ring 33 serves as a linear guide member for guiding both the second lens group moving frame 35 that supports the second lens group LG2 and the third lens group moving frame 36 that supports the third lens group LG3 linearly without rotating the second lens group moving frame 35 and the third lens group moving frame 36, while the set of six radial projections 34a of the second external barrel 34 serve as linear guide members for guiding the first external barrel 37 linearly without rotating.

Figure 8:
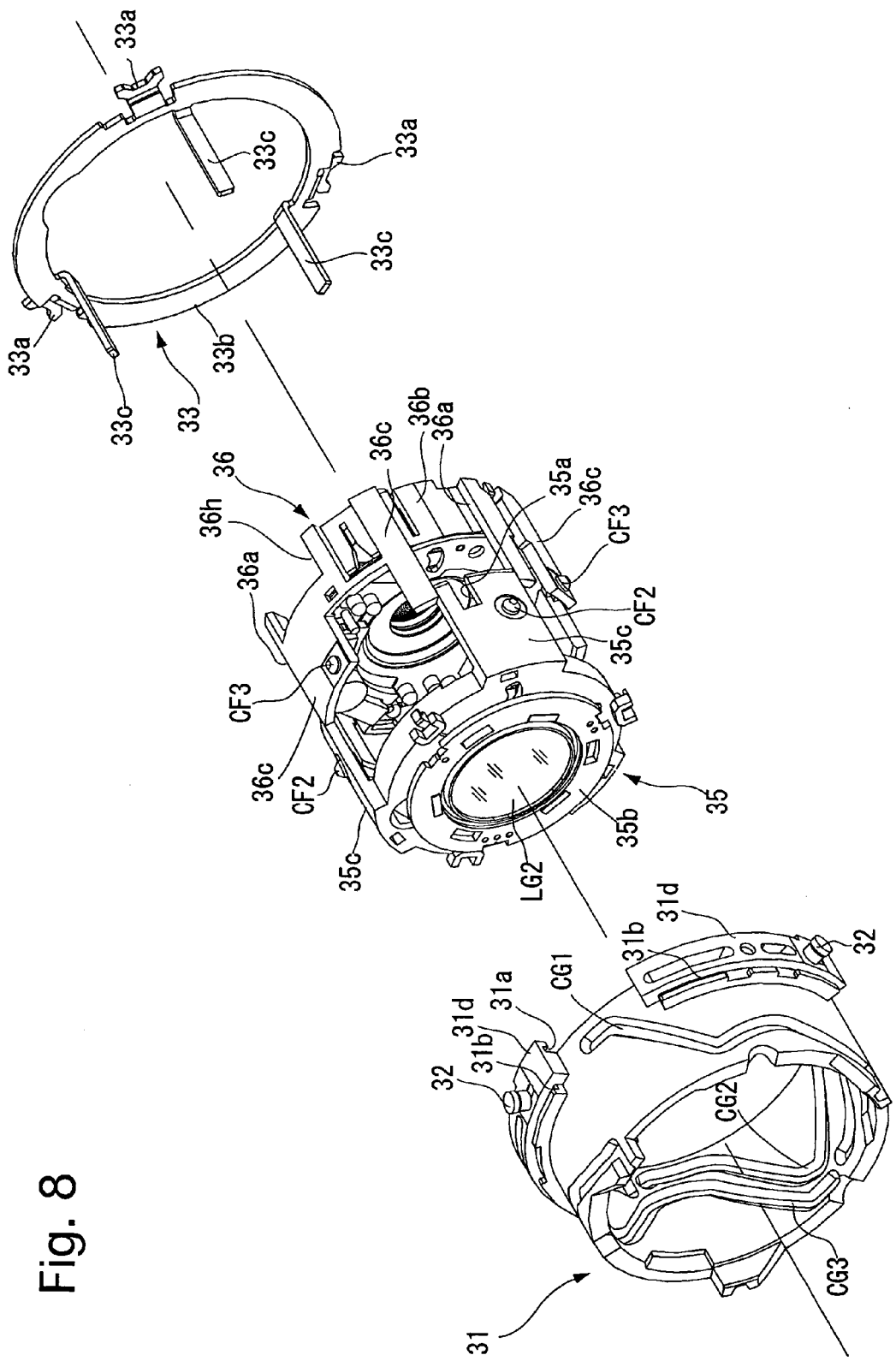
FIG. 8 is an exploded perspective view of a cam ring, a second linear guide ring, a second lens group moving frame and a third lens group moving frame of the zoom lens shown in FIGS. 1 and 2.
Figure 9:
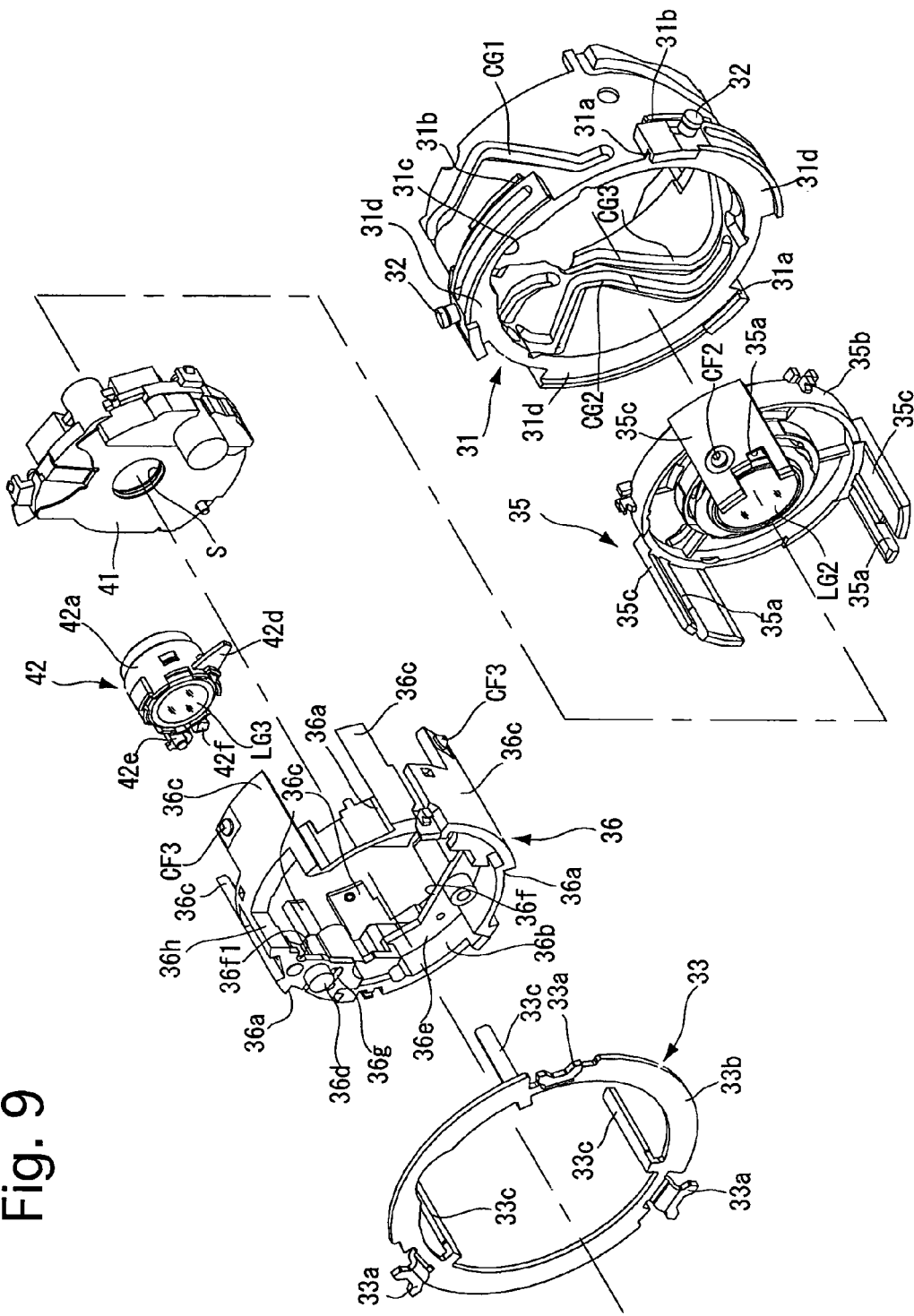
FIG. 9 is an exploded perspective view of the cam ring, the second linear guide ring, the second lens group moving frame and the third lens group moving frame which are shown in FIG. 8, viewed from a different side.
Figure 10:
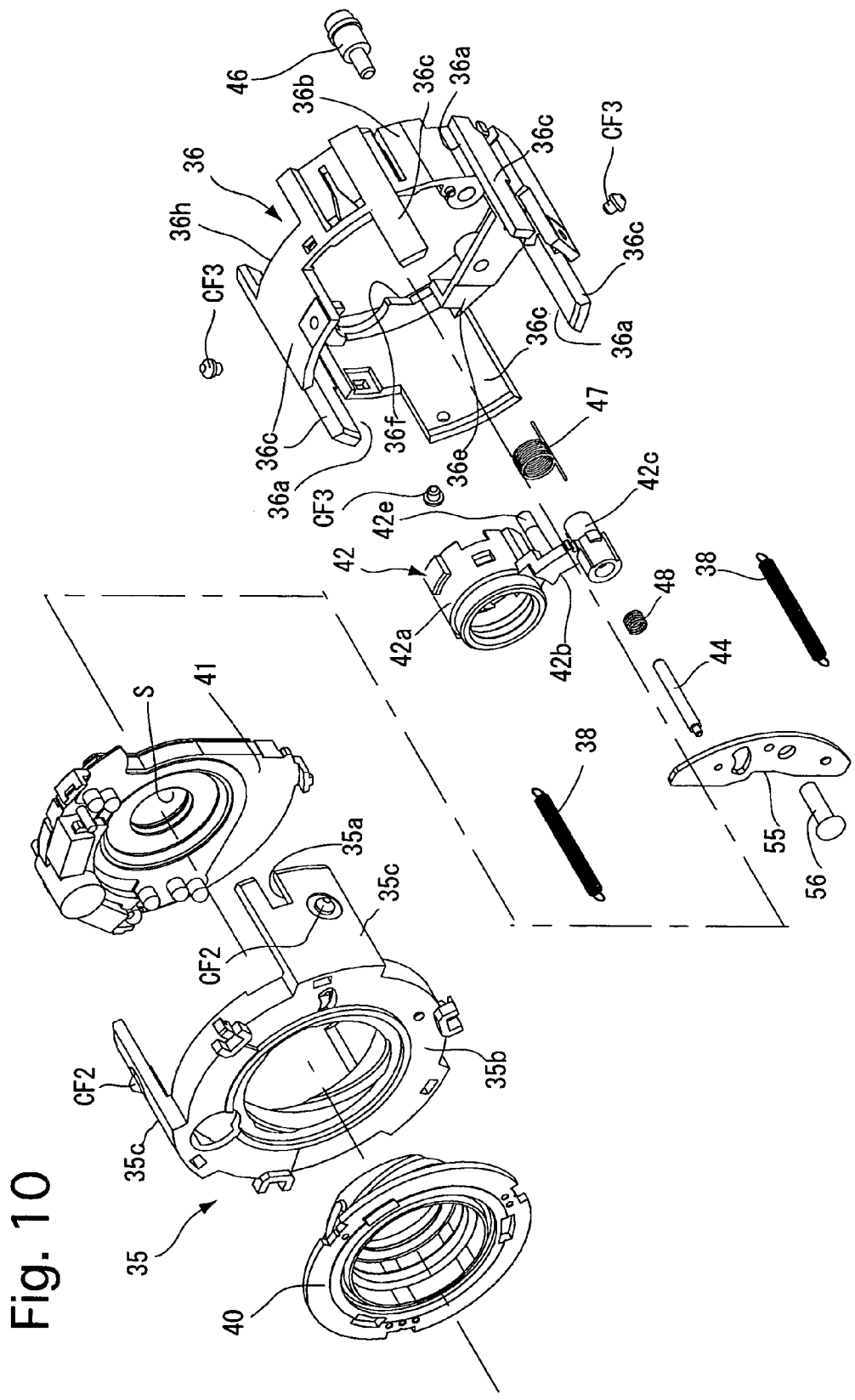
FIG. 10 is an exploded perspective view of the support structure that supports the second lens group and the third lens group.

As shown in FIGS. 8 and 9, the second linear guide ring 33 is provided on the ring portion 33b with a set of three linear guide keys 33c which project forward parallel to one another from the ring portion 33b. A discontinuous outer edge of the ring portion 33b is engaged in a discontinuous circumferential groove 31a formed on an inner peripheral surface of the cam ring 31 at the rear end thereof to be rotatable about the photographing optical axis Z1 relative to the cam ring 31 and to be immovable relative to the cam ring 31 in the optical axis direction. The set of three linear guide keys 33c project forward from the ring portion 33b into the cam ring 31. The second lens group moving frame 35 is provided with a corresponding set of three guide grooves 35a in which the set of three linear guide keys 33c are engaged, respectively. As shown in FIG. 9, the second lens group moving frame 35 is further provided with a ring portion 35b having its center on the photographing optical axis Z1, and a set of three rearward projections 35c which project rearward in parallel to one another from the ring portion 35b in the optical axis direction. The aforementioned set of three linear guide grooves 35a are formed on the set of three rearward projections 35c, respectively. The set of three rearward projections 35c are arranged at substantially equi-angular intervals in a circumferential direction of the second lens group moving frame 35. The set of three rearward projections 35c are engaged in a corresponding set of three linear guide grooves 36a formed on an outer peripheral surface of the third lens group moving frame 36 at different circumferential positions to be slidable thereon along the set of three linear guide grooves 36a, respectively. The third lens group moving frame 36 is provided with a ring portion 36b having its center on the photographing optical axis Z1, and a set of six forward projections 36c which project both radially outwards from the ring portion 36b and forward in parallel to one another from the ring portion 36b in the optical axis direction. Each of the aforementioned set of three linear guide grooves 36a is formed by a combination of an outer peripheral surface of the ring portion 36b (bottom surface of the linear guide groove 36a) and side surfaces of associated adjacent two forward projections 36c on opposite sides of the outer peripheral surface of the ring portion 36b in a circumferential direction thereof. The second lens group moving frame 35 and the third lens group moving frame 36 are biased toward each other in the optical axis direction. Due to this structure of engagement between the second lens group moving frame 35 and the third lens group moving frame 36, the second lens group moving frame 35 is guided linearly in the optical axis direction by the second linear guide ring 33, and the third lens group moving frame 36 is guided linearly in the optical axis direction by the second lens group moving frame 35.

Figure 20:
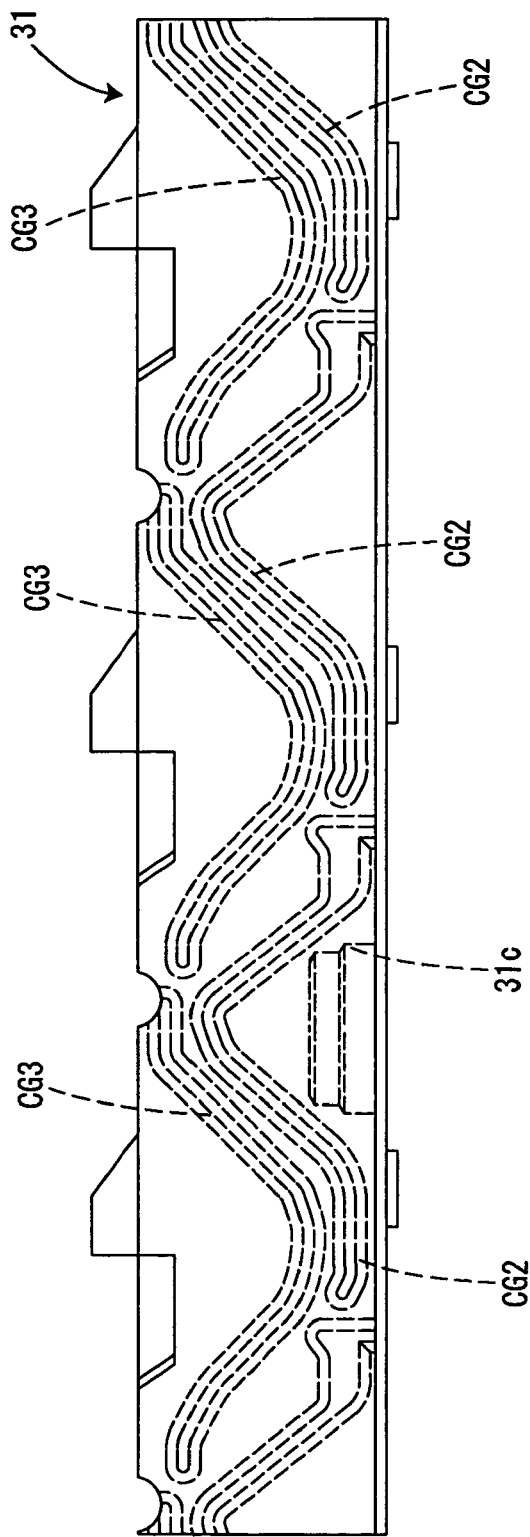
FIG. 20 is a developed view of the cam ring.

As shown in FIGS. 8, 9 and 20, the cam ring 31 is provided on an inner peripheral surface thereof with a set of three front inner cam grooves CG3, and a set of three rear inner cam grooves CG2 formed behind the set of three front inner cam grooves CG3. The second lens group moving frame 35 is provided on outer peripheral surfaces of the set of three rearward projections 35c with a set of three rear cam followers CF2 which are engaged in the set of three rear inner cam grooves CG2 of the cam ring 31, respectively. The third lens group moving frame 36 is provided on outer peripheral surfaces of three of the six forward projections 36c with a set of three front cam followers CF3 which are engaged in the set of three front inner cam grooves CG3 of the cam ring 31, respectively. Each of the following four sets of grooves or followers, i.e., the set of three front inner cam grooves CG3, the set of three rear inner cam grooves CG2, the set of three front cam followers CF3 and the set of three rear cam followers CF2, are formed at substantially equiangular intervals in a circumferential direction about the photographing optical axis Z1. Since each of the second lens group moving frame 35 and the third lens group moving frame 36 is guided linearly in the optical axis direction directly or indirectly by the second linear guide ring 33, a rotation of the cam ring 31 causes the second lens group moving frame 35 and the third lens group moving frame 36 to move in the optical axis direction in a predetermined moving manner in accordance with contours of the set of three rear inner cam grooves CG2 and the front inner cam grooves CG3.

The zoom lens 10 is provided with a second lens frame 40 which supports the second lens group LG2. The second lens frame 40 is supported by the ring portion 35b of the second lens group moving frame 35 (see FIG. 10). The second lens frame 40 is fixed to the ring portion 35b of the second lens group moving frame 35 by the engagement of a male screw thread (adjusting screw) formed on an outer peripheral surface of the second lens frame 40 with a female screw thread (adjusting screw) formed on an inner peripheral surface of the second lens group moving frame 40. The male screw thread of the second lens frame 40 and the female screw thread of the second lens group moving frame 35 are formed with respective centers thereof on the photographing optical axis Z1. Accordingly, the position of the second lens frame 40 relative to the second lens group moving frame 35 in the optical axis direction can be adjusted by rotating the second lens frame 40 relative to the second lens group moving frame 35.

The zoom lens 10 is provided between the second and third lens groups LG2 and LG3 with a shutter unit 41 including the shutter S. The shutter unit 41 is positioned radially inside of the third lens group moving frame 36 to be supported thereby. An actuator for driving the shutter S is incorporated in the shutter unit 41.

The zoom lens 10 is provided inside of the third lens group moving frame 36 with a third lens frame (radially-retractable lens frame) 42 which supports and holds the third lens group LG3 to be positioned behind the shutter unit 41. The third lens frame 42 is pivoted about a pivot shaft 44 which is fixed to the third lens group moving frame 36 to project forward. The pivot shaft 44 is positioned a predetermined distance away from the photographing optical axis Z1, and extends parallel to the photographing optical axis Z1. The third lens frame 42 is swingable about the pivot shaft 44 between a photographing position shown in FIGS. 1, 22 and 26 where the optical axis of the third lens group LG3 coincides with the photographing optical axis Z1 and a radially-retracted position shown in FIGS. 2, 23, 24, 25 and 27 where the optical axis of the third lens group LG3 is positioned at a radially retracted optical axis Z2 shown in FIGS. 2 and 27). A rotation limit pin (stop pin) 46, which prevents the third lens frame 42 from rotating clockwise as viewed in FIG. 26 beyond a predetermined point to determine the photographing position of the third lens frame 42, is fixed to the third lens group moving frame 36. The third lens frame 42 is biased to rotate in a direction (clockwise as viewed in FIG. 26) to come into contact with the rotation limit pin 46 by a torsion coil spring 47. A compression coil spring 48 is fitted on the pivot shaft 44 to bias the third lens frame 42 rearward in the optical axis direction to remove backlash between the third lens frame 42 and the third lens group moving frame 36.

Figure 21:
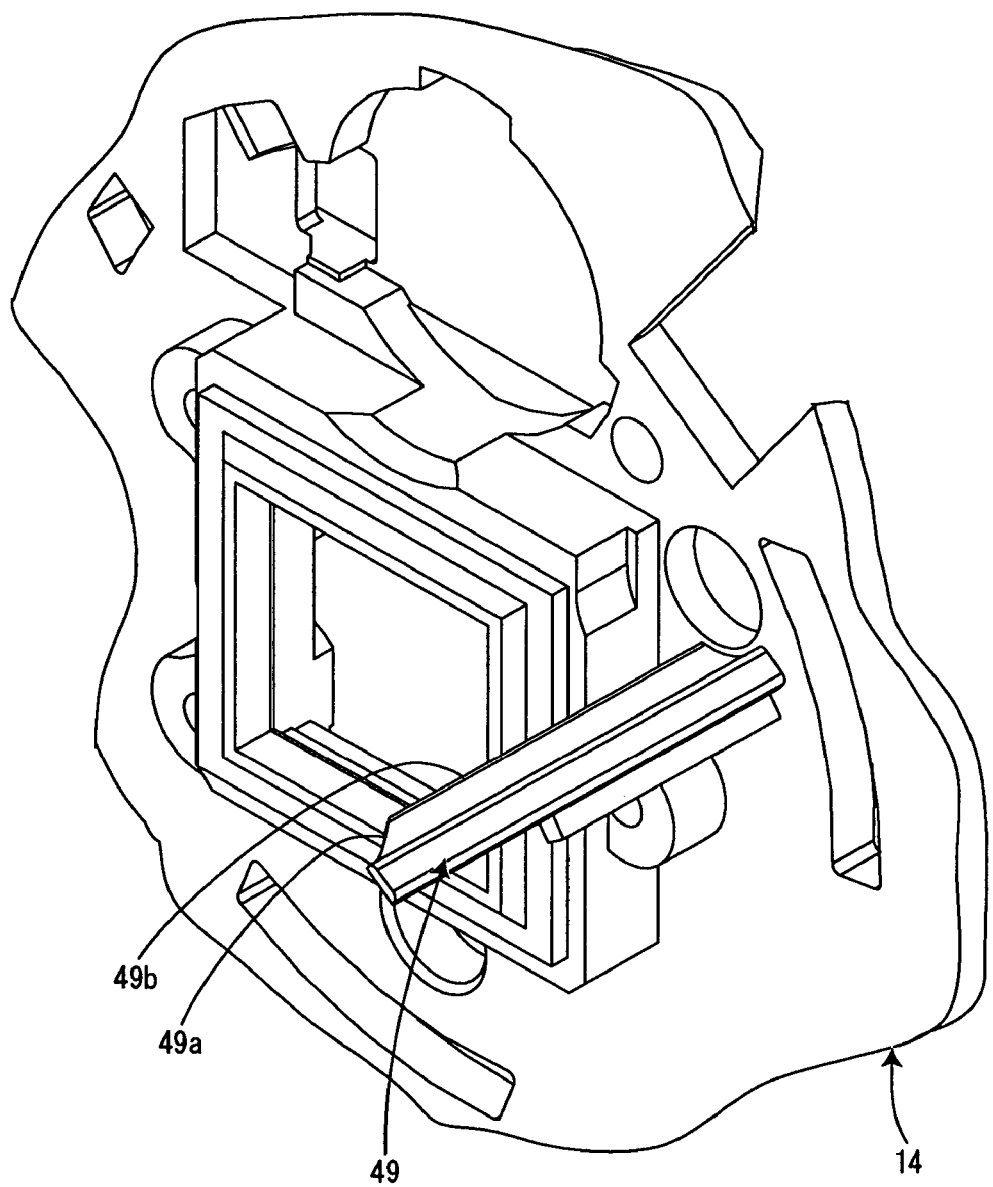
FIG. 21 is a perspective view of a portion of the CCD holder in the vicinity of a position-control cam bar thereof.

The third lens frame 42 moves together with the third lens group moving frame 36 in the optical axis direction. As shown in FIGS. 6 and 21, the CCD holder 14 is provided on a front surface thereof with a position-control cam bar (retracting member) 49 which projects forward from the CCD holder 14 to be engageable with the third lens frame 42. If the third lens group moving frame 36 moves rearward in a retracting direction to approach the CCD holder 14, a retracting cam surface 49a (see FIG. 21) formed on a front end surface of the position-control cam bar 49 comes into contact with a specific portion of the third lens frame 42 to rotate the third lens frame 42 to the radially-retracted position. The position-control cam bar 49 is further provided along an inner side edge thereof with a radially-retracted-position holding surface 49b which extends rearward from the retracting cam surface 49a in a direction parallel to the photographing optical axis Z1. The retracting operation of the third lens frame 42 which is performed with the position-control cam bar 49 will be discussed in detail later.

Figure 11:
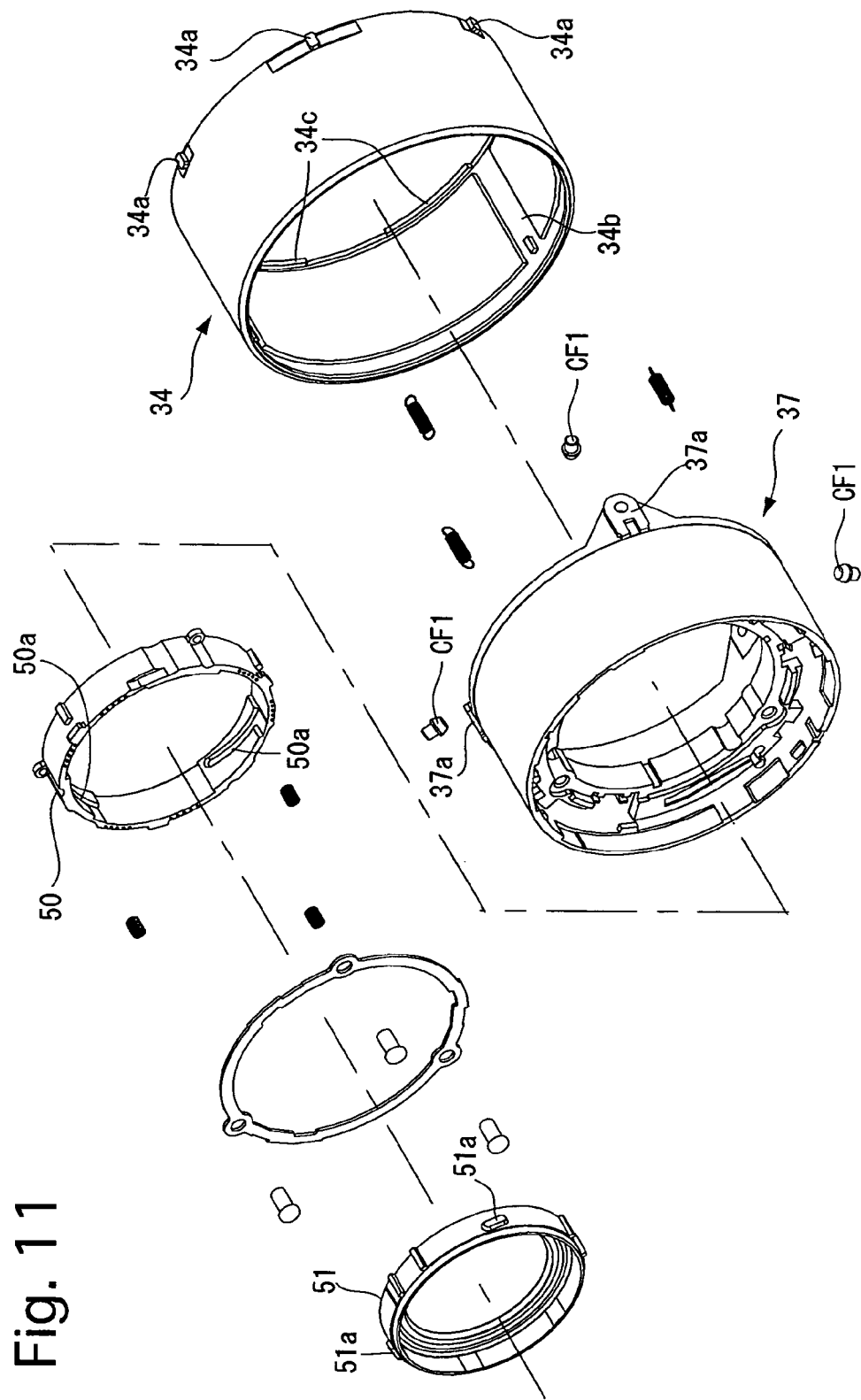
FIG. 11 is an exploded perspective view of a support structure that supports a first lens group.

As shown in FIG. 11, the second external barrel 34 is provided on an inner peripheral surface thereof with a set of three linear guide grooves 34b which are formed at different circumferential positions to extend parallel the photographing optical axis Z1. The first external barrel 37 is provided on an outer peripheral surface at the rear end thereof with a set of three engaging protrusions 37a which are slidably engaged in the set of three linear guide grooves 34b, respectively. Accordingly, the first external barrel 37 is guided linearly in the optical axis direction without rotating via the first linear guide ring 30 and the second external barrel 34. The second external barrel 34 is further provided on an inner peripheral surface thereof in the vicinity of the rear end of the second external barrel 34 with a discontinuous inner flange 34c which extends along a circumference of the second external barrel 34. The cam ring 31 is provided on an outer peripheral surface thereof with a discontinuous circumferential groove 31b in which the discontinuous inner flange 34c is slidably engaged so that the cam ring 31 is rotatable about the photographing optical axis Z1 relative to the second external barrel 34 and so that the second external barrel 34 is immovable in the optical axis direction relative to the cam ring 31 (i.e., the second external barrel 34 moves together with the cam ring 31 in the optical axis direction). On the other hand, the first external barrel 37 is provided on an inner peripheral surface thereof with a set of three cam followers CF1 which project radially inwards, and the cam ring 31 is provided on an outer peripheral surface thereof with a set of three outer cam grooves CG1 in which the set of three cam followers CF1 are slidably engaged, respectively.

The zoom lens 10 is provided inside of the first external barrel 37 with a first lens frame 51 which is supported by the first external barrel 37 via a first lens group adjustment ring 50. The first lens group LG1 is supported by the first lens frame 51 to be fixed thereto. The first lens frame 51 is provided on an outer peripheral surface thereof with a partial male screw thread 51a, and the first lens group adjustment ring 50 is provided on an inner peripheral surface thereof with a partial female screw thread 50a which is engaged with the male screw thread 1a (see FIG. 11). The position of the first lens frame 51 relative to the first lens group adjustment ring 50 in the optical axis direction can be adjusted during assembly of the zoom lens 10 via the partial male screw thread 51a and the partial female screw thread 50a.

The zoom lens 10 is provided at the front end of the first external barrel 37 with a lens barrier mechanism 54 (see FIG. 5) which automatically closes a front end aperture of the zoom lens 10 when the zoom lens 10 is retracted as shown in FIG. 2 to protect the frontmost lens element of the photographing optical system of the zoom lens 10, i.e. the first lens group LG1, from getting stains and scratches thereon when the digital camera is not in use. The lens barrier mechanism 54 is provided with a plurality of barrier blades (a front pair of barrier blades and a rear pair of barrier blades) 54a. The lens barrier mechanism 54 operates so that the plurality of barrier blades 54a are fully shut in front of the first lens group LG1 in the retracted state of the zoom lens 10 shown in FIG. 2, and are fully opened in a ready-to-photograph state of the zoom lens 10 shown in FIG. 1.

Figure 30:
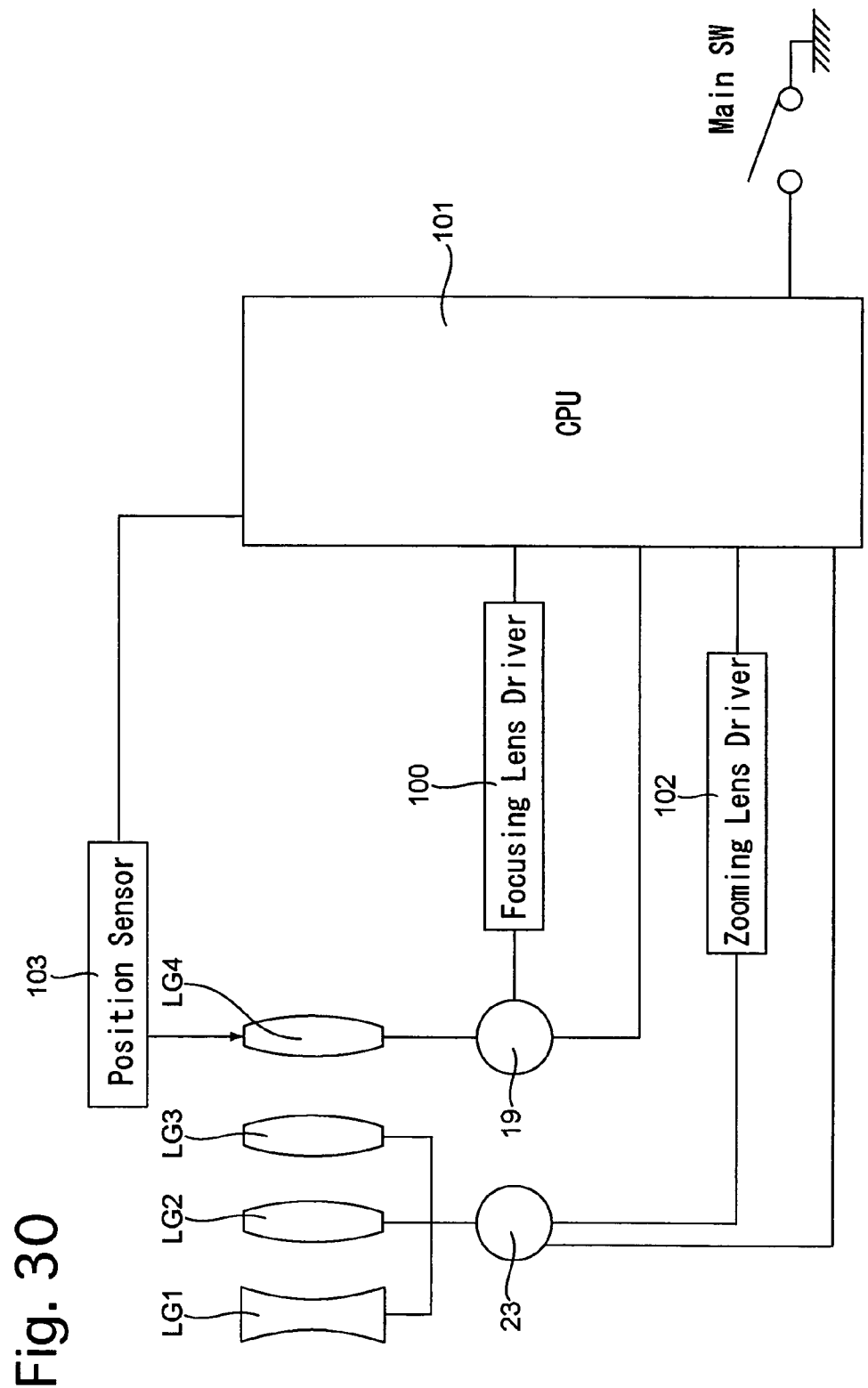
FIG. 30 is a block diagram of a movable lens control system and associated elements thereof.

As shown in FIG. 30, the AF motor 19 and the zoom motor 23 are electrically connected to a control system provided inside of the camera body (not shown).

Specifically, the AF motor 19 is electrically connected to a controller (CPU) 101 via a focusing lens driver 100, and the zoom motor 23 is electrically connected to the controller 101 via a zooming lens driver 102. The AF motor 19, the focusing lens driver 100, the zoom motor 23, the zooming lens driver 102 and the controller 101 constitute a lens control device. Pulse signals generated by the controller 101 are output to the AF motor 19 and the zoom motor 23 via the focusing lens driver 100 and the zooming lens driver 102, respectively. The controller 101 counts (controls) pulses of the pulse signal output to the AF motor 19, wherein positive (+) pulses rotate the AF motor 19 in a forward direction to move the fourth lens group LG4 forward, and negative (−) pulses rotate the AF motor 19 in a reverse direction to move the fourth lens group rearward LG4 rearward. In addition, the controller 101 counts (controls) pulses of the pulse signal output to the zoom motor 23, wherein negative (−) pulses rotate the zoom motor 23 in a forward direction to move the first, second and third lens groups LG1, LG2 and LG3 forward, and positive (+) pulses rotate the zoom motor 23 in a reverse direction to move the first, second and third lens groups LG1, LG2 and LG3 rearward.

A position sensor (position detector) 103 is electrically connected to the controller 101. The position sensor 103 is used to detect the position of the fourth lens group LG4 to determine whether the fourth lens group LG4 is in a normal moving range (i.e., a range of movement of the fourth lens group LG4 which is rearwards from a predetermined reference position thereof in the optical axis direction Z1) or an abnormal moving range (i.e., a range of movement of the fourth lens group LG4 in front of the aforementioned reference position in the optical axis direction Z1).

Figure 31:
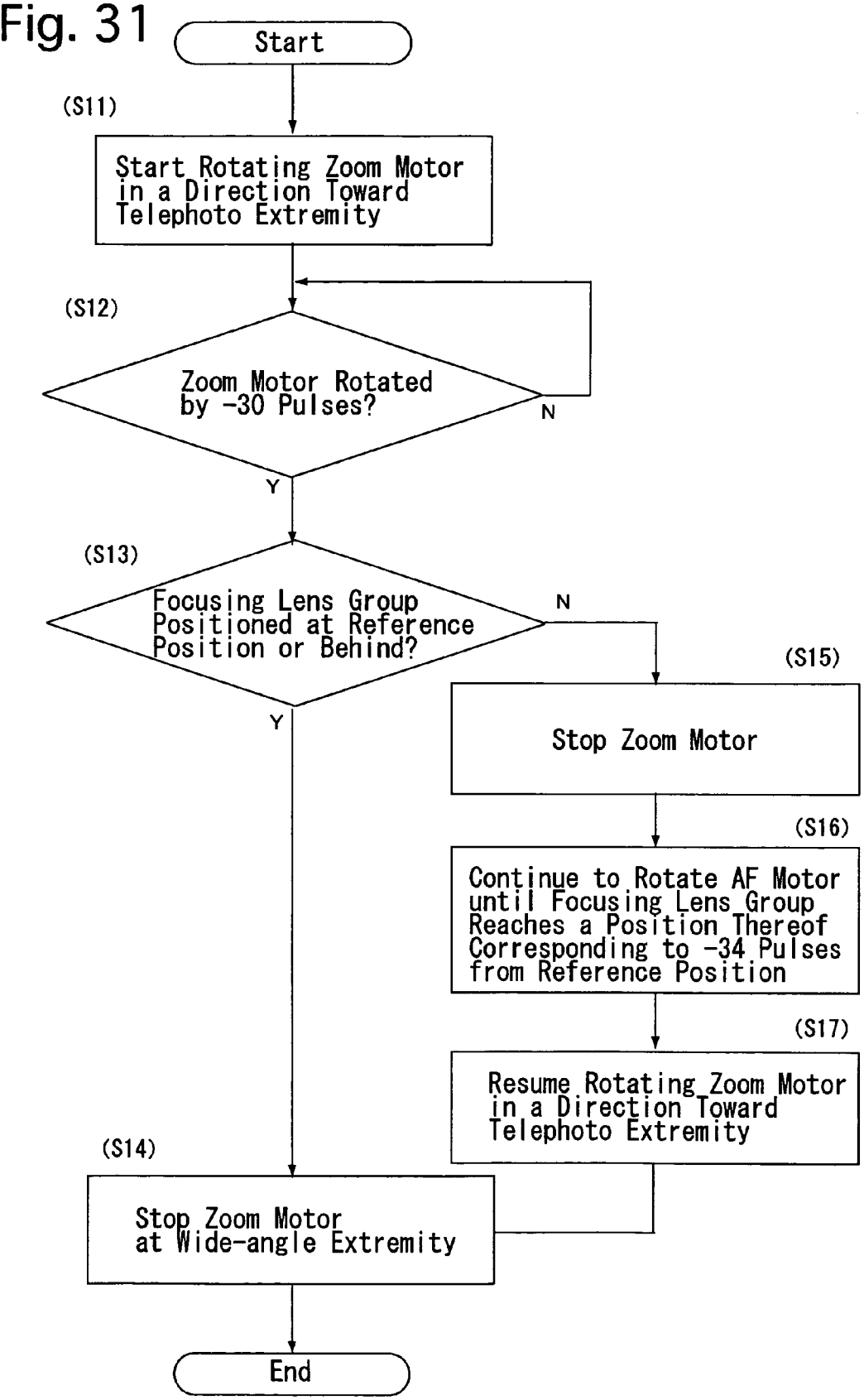

A lens barrel advancing operation and a lens barrel retracting operation of the zoom lens 10 having the above described structure will be hereinafter discussed with reference to the flow chart shown in FIG. 31. In the state shown in FIG. 2, in which the zoom lens 10 is in the retracted state, the controller 101 starts sending a pulse signal to the zooming lens driver 102 to rotate the zoom motor 23 forward upon a main switch SW (see FIG. 30) of the digital camera being turned ON (step S11). At the instant at which the main switch SW is turned ON, the first lens group LG1, the second lens group LG2 and the third lens group LG3 are still in respective initial positions (retracted positions) thereof which correspond the limits of rearward movement of the first lens group LG1, the second lens group LG2 and the third lens group LG3 in the optical axis direction, respectively. Rotating the zoom gear 22 in the lens barrel advancing direction by the zoom motor 23 causes a combination of the helicoid ring 25 and the third external barrel 26 to move forward while rotating due to the engagement of the female helicoid 13a with the male helicoid 25a, and further causes the first linear guide ring 30 to move forward linearly together with the helicoid ring 25 and the third external barrel 26. At this time, firstly the cam ring 31 does not rotate but only linearly moves forward together with the helicoid ring 25, the third external barrel 26 and the first linear guide ring 30, and subsequently torque is transferred to the cam ring 31 from the third external barrel 26 to move forward while rotating relative to the first linear guide ring 30 by the engagement of the set of roller followers 32 with the first lead slot portions 30e-2 of the set of through slots 30e after having been rotated by the aforementioned rotation of the combination of the helicoid ring 25 and the third external barrel 26 by an angle of approximately 30 degrees.

In this rotating operation of the cam ring 31, immediately after the controller 101 determines that the number of pulses (steps) of a pulse signal which is sent to the zoom motor 23 from the controller 101 has reached −30 (minus thirty pulses) (if YES at step S12), it is determined whether the fourth lens group LG4 is in the aforementioned normal moving range via the position sensor 103 (step S13). If it is determined that the fourth lens group LG4 is in the normal moving range (if YES at step S13), the controller 101 continues to send the pulse signal to the zoom motor 23 to continue to rotate the zoom motor 23 forward.

Immediately after the helicoid ring 25 and the third external barrel 26 are extended forward to respective predetermined positions thereof, the male helicoid 25a of the helicoid ring 25 and the female helicoid 13a of the stationary barrel 13 are disengaged from each other, so that the helicoid ring 25 and the third external barrel 26 rotate about the photographing optical axis Z1 without moving in the optical axis direction due to the slidable engagement of the set of three rotational guide projections 25b with the set of three rotational guide grooves 13d. After a lapse of a predetermined period of time from the moment at which the helicoid ring 25 and the third external barrel 26 stop moving forward in the optical axis direction (i.e., the moment at which the set of three rotational guide projections 25b slide into the set of three rotational guide grooves 13d from the set of three inclined grooves 13c, respectively), the set of three roller followers 32 enter the second lead slot portion 30e-3 from the first lead slot portions 30e-2 of the set of three through slots 30e, respectively, so that the cam ring 31 is further moved forward while rotating relative to the first linear guide ring 30.

Figure 22:
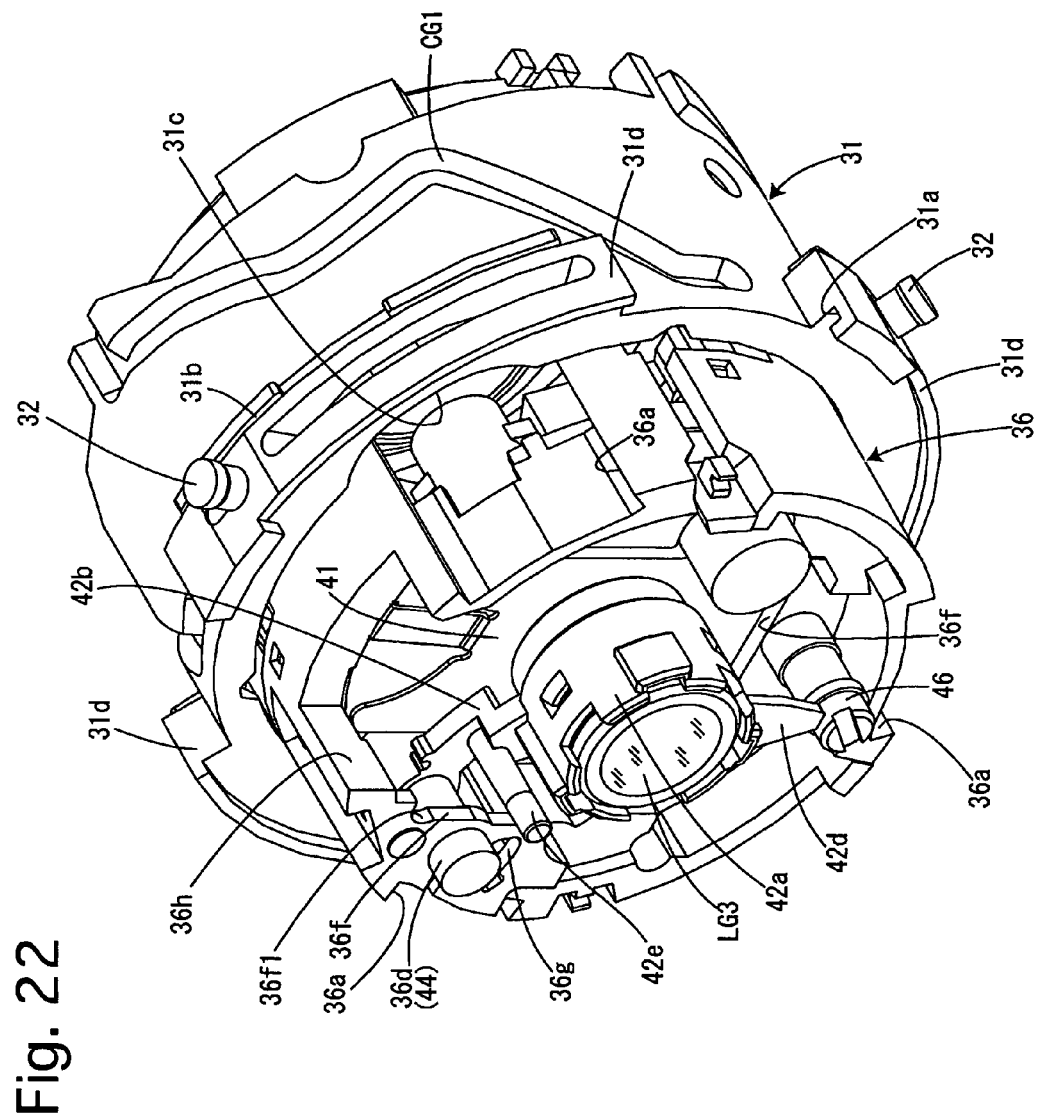
FIG. 22 is a perspective view of the cam ring, the third lens group moving frame and a third lens frame (radially-retractable lens frame) in a ready-to-photograph state of the zoom lens, viewed obliquely from behind.
Figure 26:
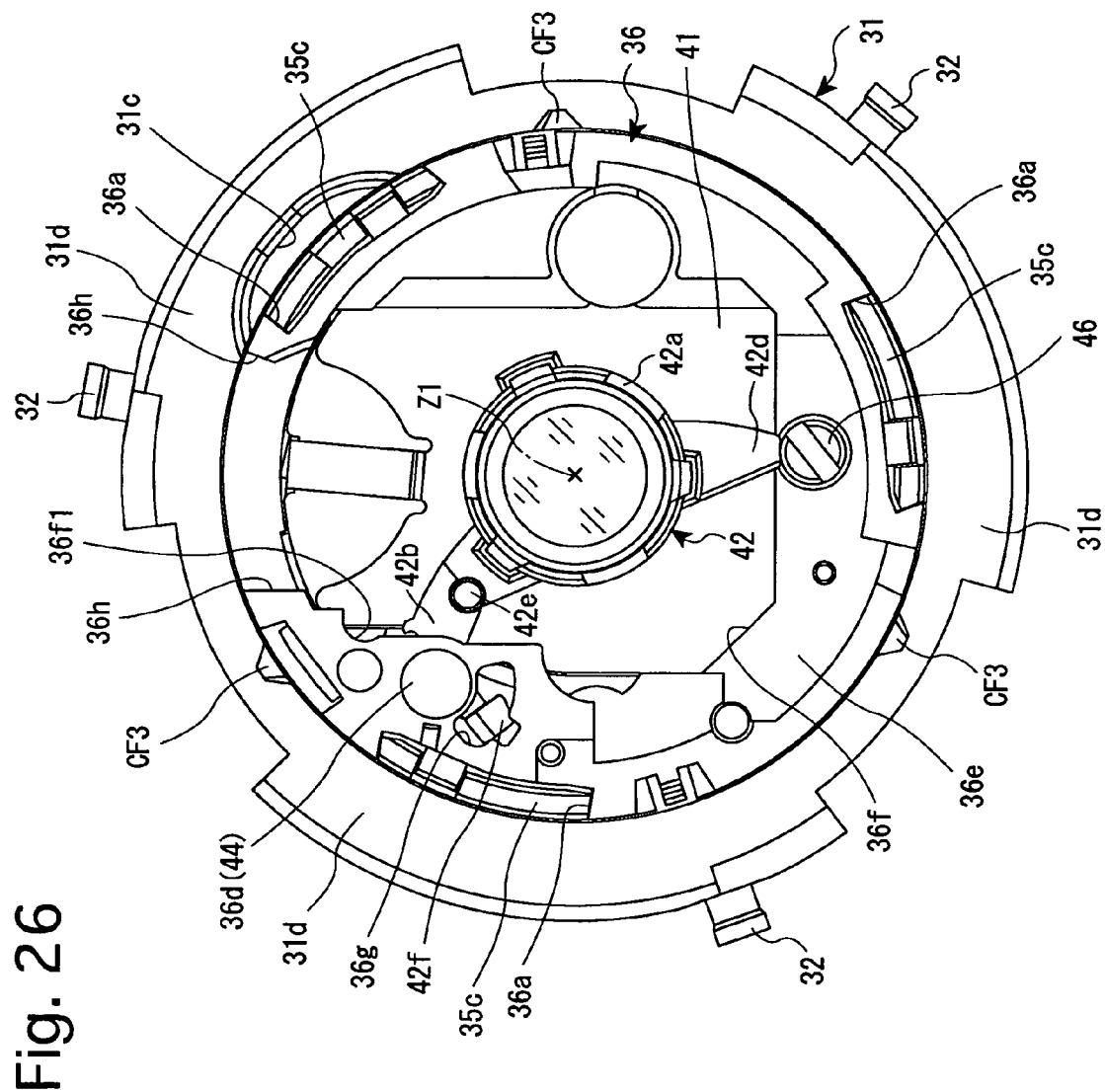
FIG. 26 is a rear elevational view of the cam ring, the third lens group moving frame and the third lens frame in the state shown in FIG. 22, in which the third lens frame is held in the photographing position thereof.

A rotation of the cam ring 31 causes each of the second lens group moving frame 35 and the third lens group moving frame 36, which are positioned inside of the cam ring 31 and guided linearly in the optical axis direction without rotating directly or indirectly by the second linear guide ring 33, to move in the optical axis direction with respect to the cam ring 31 in a predetermined moving manner due to the engagement of the set of front cam followers CF3 with the set of front inner cam grooves CG3 and the engagement of the set of rear cam followers CF2 with the set of rear inner cam grooves CG2, respectively. In the state shown in FIG. 2 in which the zoom lens 10 is in the retracted state, the third lens frame 42, which is provided in the third lens group moving frame 36, has rotated about the pivot shaft 44 to be held in the radially-retracted position above the photographing optical axis Z1 by the position-control cam bar 49, so that the optical axis of the third lens group LG3 is moved from the photographing optical axis Z1 to the retracted optical axis Z2 that is positioned above the photographing optical axis Z1. In the course of movement of the third lens group moving frame 36 from the retracted position to a position in the zooming range as shown in FIGS. 1, 22 and 26, the third lens frame 42 is disengaged from the position-control cam bar 49 at some point during the time the cam ring 31 linearly moves forward without rotating (before the cam ring 31 rotates by the aforementioned angle of approximately 30 degrees) so that the third lens frame 42 rotates about the pivot shaft 44 from the radially-retracted position to the photographing position shown in FIGS. 1, 22 and 26 where the optical axis of the third lens group LG3 coincides with the photographing optical axis Z1 by the sprig force of the torsion coil spring 47. The zoom motor 23 continues to rotate forward until the third lens group LG3 (and also the first and second lens groups LG1 and LG2) reaches the axial position thereof at wide-angle extremity (step S14). Thereafter, the third lens frame 42 remains stationary at the photographing position until the zoom lens 10 is retracted to the position shown in FIG. 2.

On the other hand, if it is determined at step S13 that the fourth lens group LG4 is in the aforementioned abnormal moving range (if NO at step S13), the controller 101 stops sending the pulse signal to the zooming lens driver 102 so that the zoom motor 23 stops rotating (step S15). Thereupon, the controller 101 starts sending a pulse signal to the focusing lens driver 101 to rotate the AF motor 19 rearward, and continues to send the pulse signal to keep moving the fourth lens group LG4 rearward until the fourth lens group LG4 reaches the retracted position (predetermined position) thereof, which corresponds to −34 (minus thirty-four) pulses from the aforementioned reference position (step S16). Thereafter, the controller 101 resumes sending the pulse signal to the zoom motor 23 to resume rotating the zoom motor 23 forward (step S17). The zoom motor 23 continues to rotate forward until the third lens group LG3 (and also the first and second lens groups LG1 and LG2) reaches the axial position thereof at wide-angle extremity (step S14).

Figure 27:
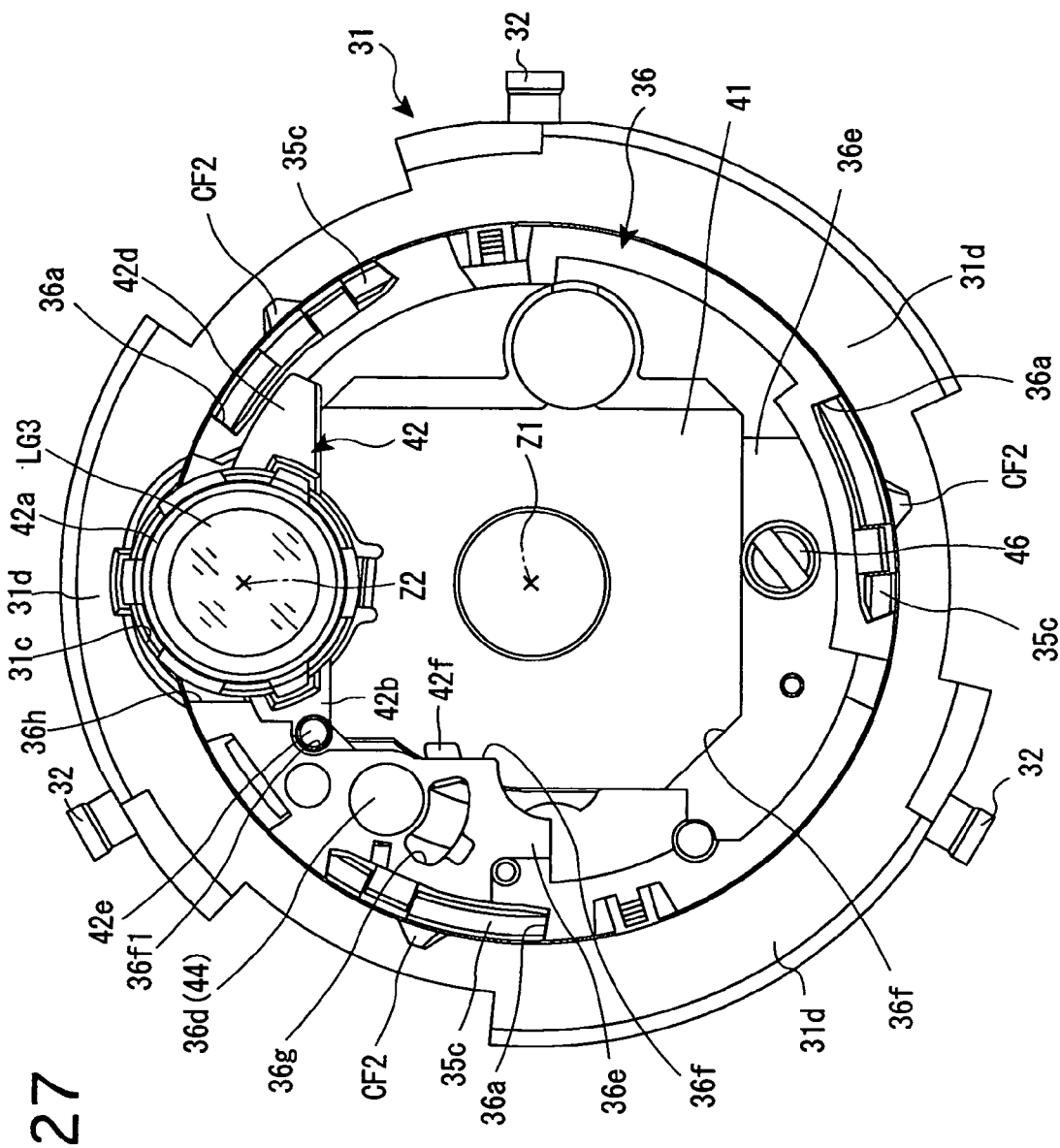
FIG. 27 is a rear elevational view of the cam ring, the third lens group moving frame and the third lens frame in the state shown in FIG. 23, in which the third lens frame is held in the radially-retracted position thereof.
Figure 32:
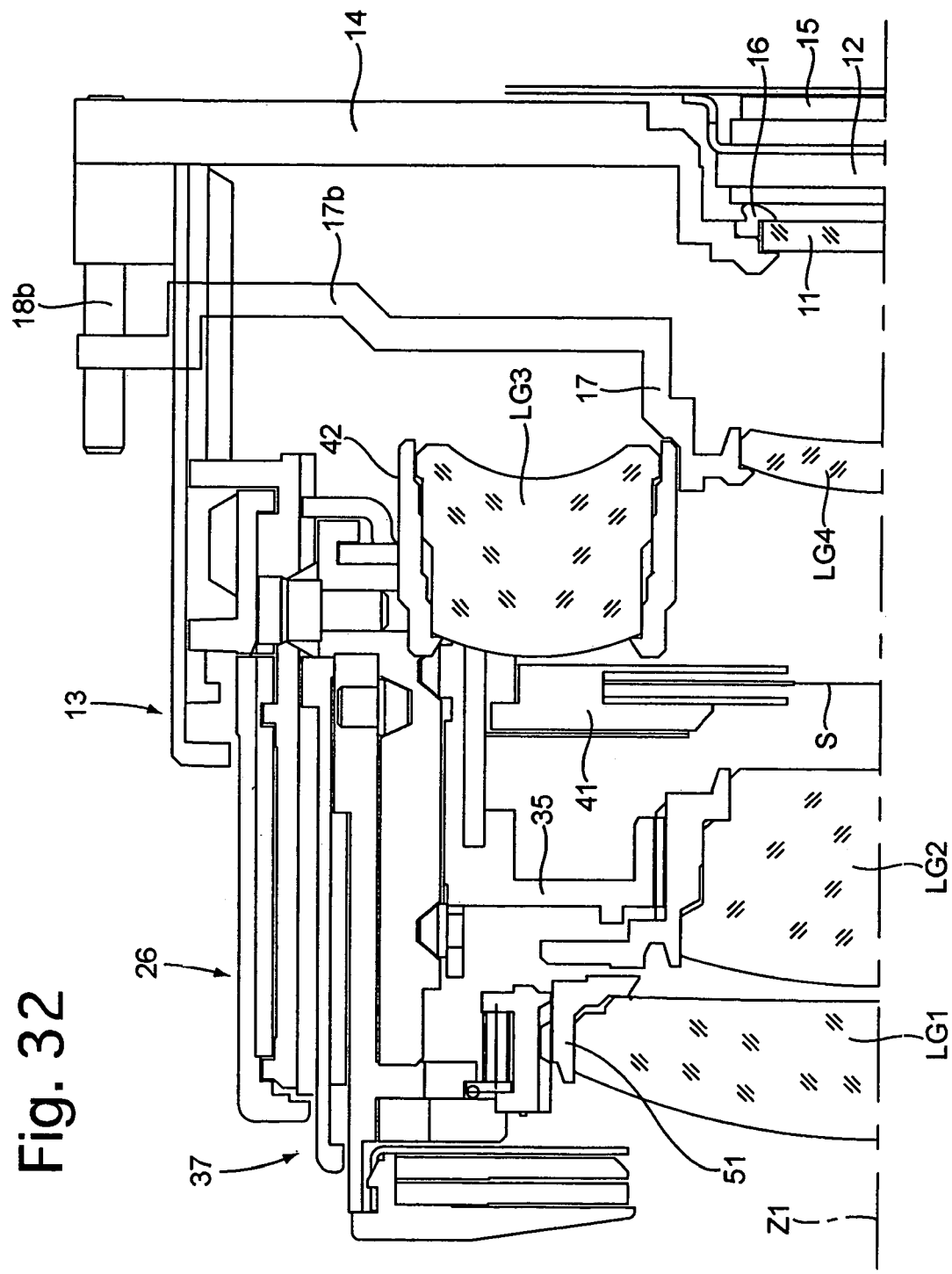
FIG. 32 is a longitudinal sectional view of the zoom lens shown in FIGS. 1 and 2, showing the upper half of the zoom lens in the event of a malfunction in which the third lens group is moved toward the photographing optical axis when the fourth lens group is in an abnormal moving range thereof.

In the case where it is determined at step S13 that the fourth lens group LG4 is in the abnormal moving range, the third lens group LG3 will hit against the AF lens frame 17 to thereby be prevented from moving to a position on the photographing optical axis Z1 by the AF lens frame 17 as shown in FIG. 32 if the forward rotation of the zoom motor 23 is not stopped to allow the third lens frame 42 to be rotated counterclockwise as viewed in FIG. 27 by the spring force of the torsion coil spring 47.

Additionally, the rotation of the cam ring 31 causes the first external barrel 37, which is positioned around the cam ring 31 and guided linearly in the optical axis direction without rotating, to move in the optical axis direction relative to the cam ring 31 in a predetermined moving manner due to engagement of the set of three cam followers CF1 with the set of three outer cam grooves CG1, respectively.

Therefore, an axial position of the first lens group LG1 relative to the picture plane (a light-sensitive surface of the CCD image sensor 12) when the first lens group LG1 is moved forward from the retracted position is determined by the sum of the amount of forward movement of the cam ring 31 relative to the stationary barrel 13 and the amount of movement of the first external barrel 37 relative to the cam ring 31, an axial position of the second lens group LG2 relative to the picture plane when the second lens group LG2 is moved forward from the retracted position is determined by the sum of the amount of forward movement of the cam ring 31 relative to the stationary barrel 13 and the amount of movement of the second lens group moving frame 35 relative to the cam ring 31, and an axial position of the third lens group LG3 relative to the picture plane when the third lens group LG3 is moved forward from the retracted position is determined by the sum of the amount of forward movement of the cam ring 31 relative to the stationary barrel 13 and the amount of movement of the third lens group moving frame 36 relative to the cam ring 31. A zooming operation is carried out by moving the first, second and third lens groups LG1, LG2 and LG3 on the photographing optical axis Z1 while changing the distances therebetween. When the zoom lens 10 is driven to advance from the retracted position shown in FIG. 2, the zoom lens 10 firstly moves forward to the position shown by an upper half of the zoom lens 10 from the photographing lens axis Z1 in FIG. 1, in which the zoom lens 10 is set at wide-angle extremity. Subsequently, the zoom lens 10 moves forward to the position shown by a lower half of the zoom lens 10 from the photographing lens axis Z1 in FIG. 1, in which the zoom lens 10 is set at the telephoto extremity by a further rotation of the zoom motor 23 in a lens barrel advancing direction thereof. As can be seen from these sectional views of the zoom lens 10 shown in FIG. 1, the distance between the first and second lens groups LG1 and LG2 is minimum and the distance between the second and third lens groups LG2 and LG3 is great when the zoom lens 10 is set at the wide-angle extremity. When the zoom lens 10 is set at the telephoto extremity, the distance between the first and second lens groups LG1 and LG2 is great and the distance between the second and third lens groups LG2 and LG3 is small. This variation of the distances among the first, second and third lens groups LG1, LG2 and LG3 for zooming operation is achieved by contours of the set of three outer cam grooves CG1, the set of three rear inner cam grooves CG2 and the set of three front inner cam grooves CG3. In the zooming range between the wide-angle extremity and the telephoto extremity, the helicoid ring 25 and the third external barrel 26 rotate without moving in the optical axis direction. On the other hand, in the same zooming range, the cam ring 31 moves forward and rearward in the optical axis direction while rotating due to the engagement of the set of three roller followers 32 with the second lead slot portions 30e-3 of the set of three through slots 30e of the first linear guide ring 30.

After the first, second and third lens groups LG1, LG2 and LG3, that serve as zooming lens groups, have moved to respective positions (ready-to-photograph positions) thereof in the zooming range, a focusing operation is carried out by moving the AF lens frame 17 that holds the fourth lens group LG4 along the photographing optical axis Z1 by rotation of the AF motor 19 in accordance with an object distance.

Driving the zoom motor 23 in a lens barrel retracting direction causes the zoom lens 10 to operate in the reverse manner to the above described advancing operation to retract the zoom lens 10 as shown in FIG. 2. In the course of this retracting movement of the zoom lens 10, the third lens frame 42 rotates about the pivot shaft 44 to the radially-retracted position by the position-control cam bar 49 while moving rearward together with the third lens group moving frame 36. When the zoom lens 10 is retracted to the retracted position shown in FIG. 2, the third lens group LG3 is retracted into the space radially outside of the space in which the fourth lens group LG4, the low-pass filter 11 and the CCD image sensor 12 are retracted as shown in FIG. 2, i.e., the third lens group LG3 is radially retracted into an axial range substantially identical to an axial range in the optical axis direction in which the fourth lens group LG4, the low-pass filter 11 and the CCD image sensor 12 are positioned. This structure of the zoom lens 10 for retracting the third lens group LG3 in this manner reduces the length of the zoom lens 10 when the zoom lens 10 is fully retracted, thus making it possible to reduce the thickness of the camera body in the horizontal direction as viewed in FIG. 2, i.e., in the optical axis direction.

The structure retracting the third lens group LG3 to the radially-retracted position will be hereinafter discussed in detail. In the following description, the terms "vertical direction" and "horizontal direction" refer to the vertical direction and the horizontal direction as viewed from front or rear of the digital camera such as the vertical direction and the horizontal direction of each of FIGS. 26 and 27, respectively.

Figure 28:
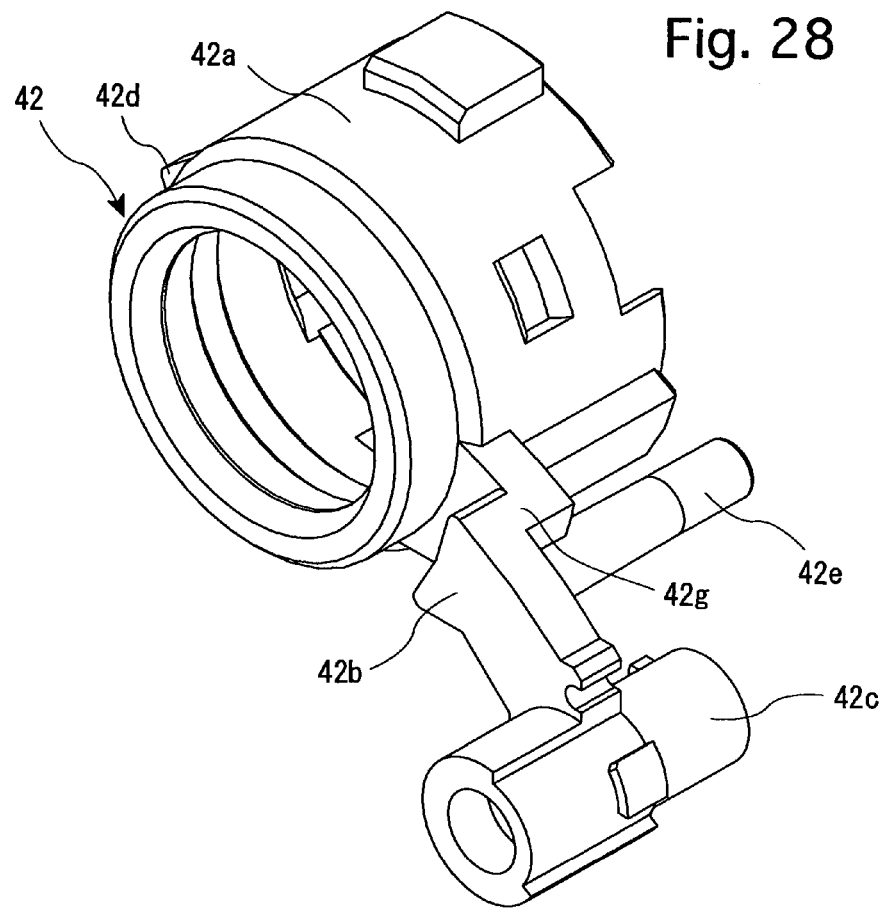
FIG. 28 is a perspective view of the third lens frame, viewed obliquely from the front thereof.
Figure 29:
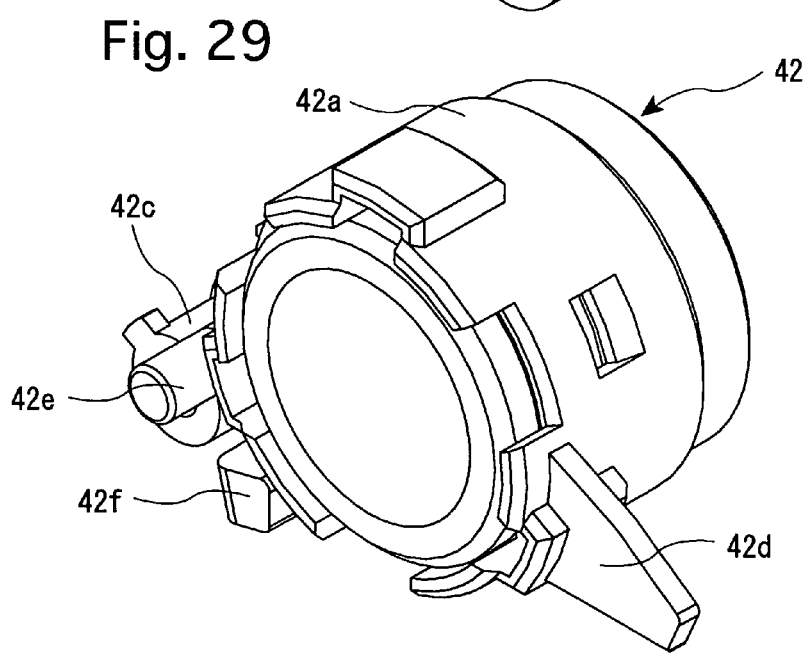
FIG. 29 is a perspective view of the third lens frame, viewed obliquely from behind.

As shown in FIGS. 28 and 29, the third lens frame 42 is provided with a cylindrical lens holder portion 42a, a swing arm portion 42b, a cylindrical pivot portion 42c and an engaging protrusion 42d. The cylindrical lens holder portion 42a directly holds and supports the third lens group LG3. The swing arm portion 42b extends in a radial direction of the cylindrical lens holder portion 42a. The cylindrical pivot portion 42c is fixed to a pivot end of the swing arm portion 42b. The engaging protrusion 42d is formed on the cylindrical lens holder portion 42a to project in a radial direction thereof on the other end (free end) of the swing arm portion 42b. The swing arm portion 42b is provided with a rear projecting portion 42e which projects rearward in the optical axis direction from the swing arm portion 42b. The cylindrical pivot portion 42c is provided with a through-hole extending in a direction parallel to the optical axis of the third lens group LG3. The third lens frame 42 is provided, in the vicinity of the cylindrical pivot portion 42c at a position away from the cylindrical pivot portion 42c, with a cam-engaging projection 42f.

The pivot shaft 44, which supports the third lens frame 42 so as to be rotatable about the pivot shaft 44, is inserted in the aforementioned through-hole of the cylindrical pivot portion 42c. Front and rear ends of the pivot shaft 44 are supported by a third lens frame support plate 55 (see FIG. 10) and a bearing portion (bearing hole) 36d of the third lens group moving frame 36, respectively. The third lens frame support plate 55 is fixed to the third lens group moving frame 36 by a set screw 56.

The third lens group moving frame 36 is provided, on an inner peripheral surface thereof at a substantially center thereof in the optical axis direction, with a central inner flange 36e. The inner edge of the central inner flange 36e forms an opening 36f (see FIGS. 9, 10, 22, 23, 26 and 27) in which the third lens frame 42 is swingable. The bearing portion 36d is formed on the central inner flange 36e. The central inner flange 36e is provided below the bearing portion 36d with a cam-engaging-projection insertion hole 36g which extends through the central inner flange 36e in the optical axis direction. The shutter unit 41 is fixed to a front surface of the central inner flange 36e. The third lens group moving frame 36 is provided, in an internal space thereof behind the central inner flange 36e below the photographing optical axis Z1, with the rotation limit pin 46. The third lens group moving frame 36 is further provided on the opposite side of the photographing optical axis Z1 from the rotation limit pin 46 with a radial opening 36h which extends through the third lens group moving frame 36 in a direction radially outwards. The radial opening 36h is formed as a cut-out of the third lens group moving frame 36 in the vicinity of the rear end thereof to be opened on a rear end surface of the third lens group moving frame 36.

Figure 23:
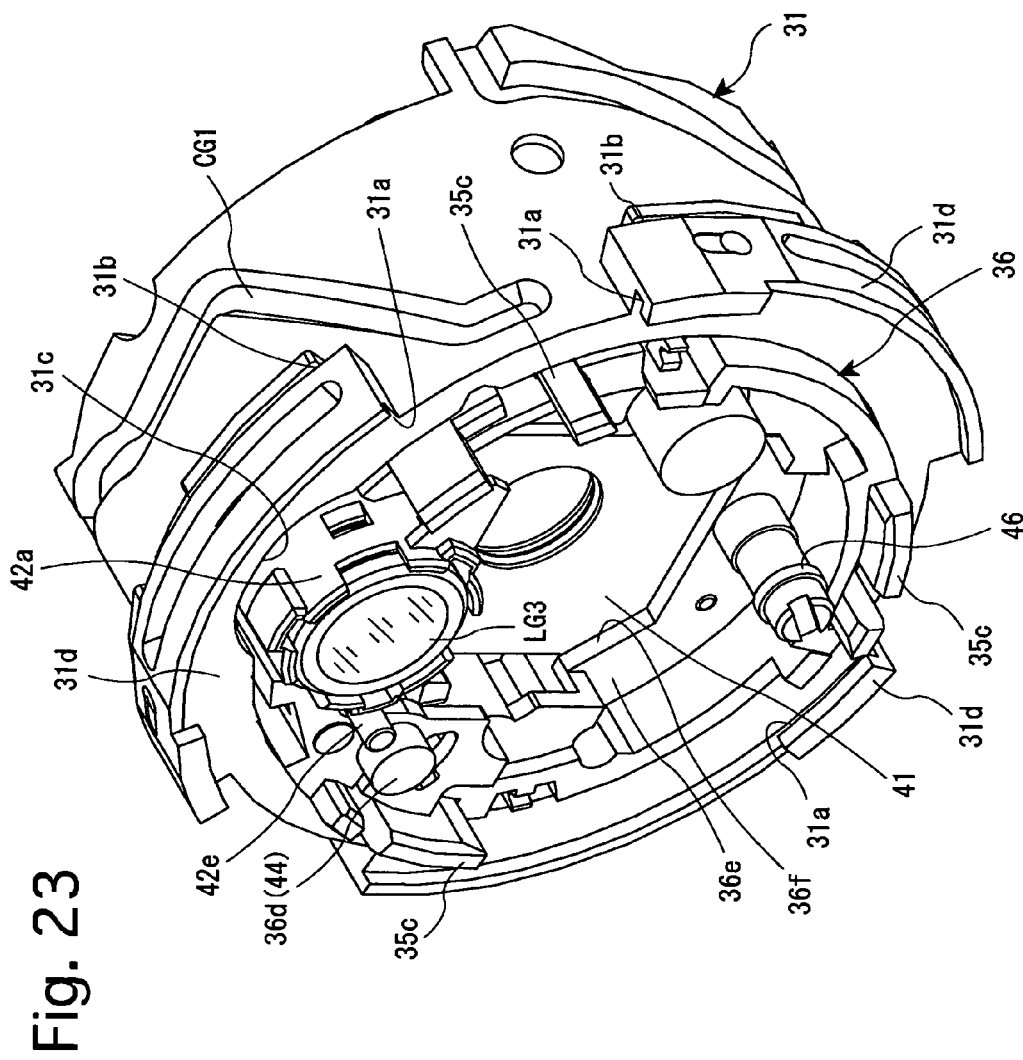
FIG. 23 is a perspective view of the cam ring, the third lens group moving frame and the third lens frame in the retracted state of the zoom lens, viewed obliquely from behind.
Figure 25:
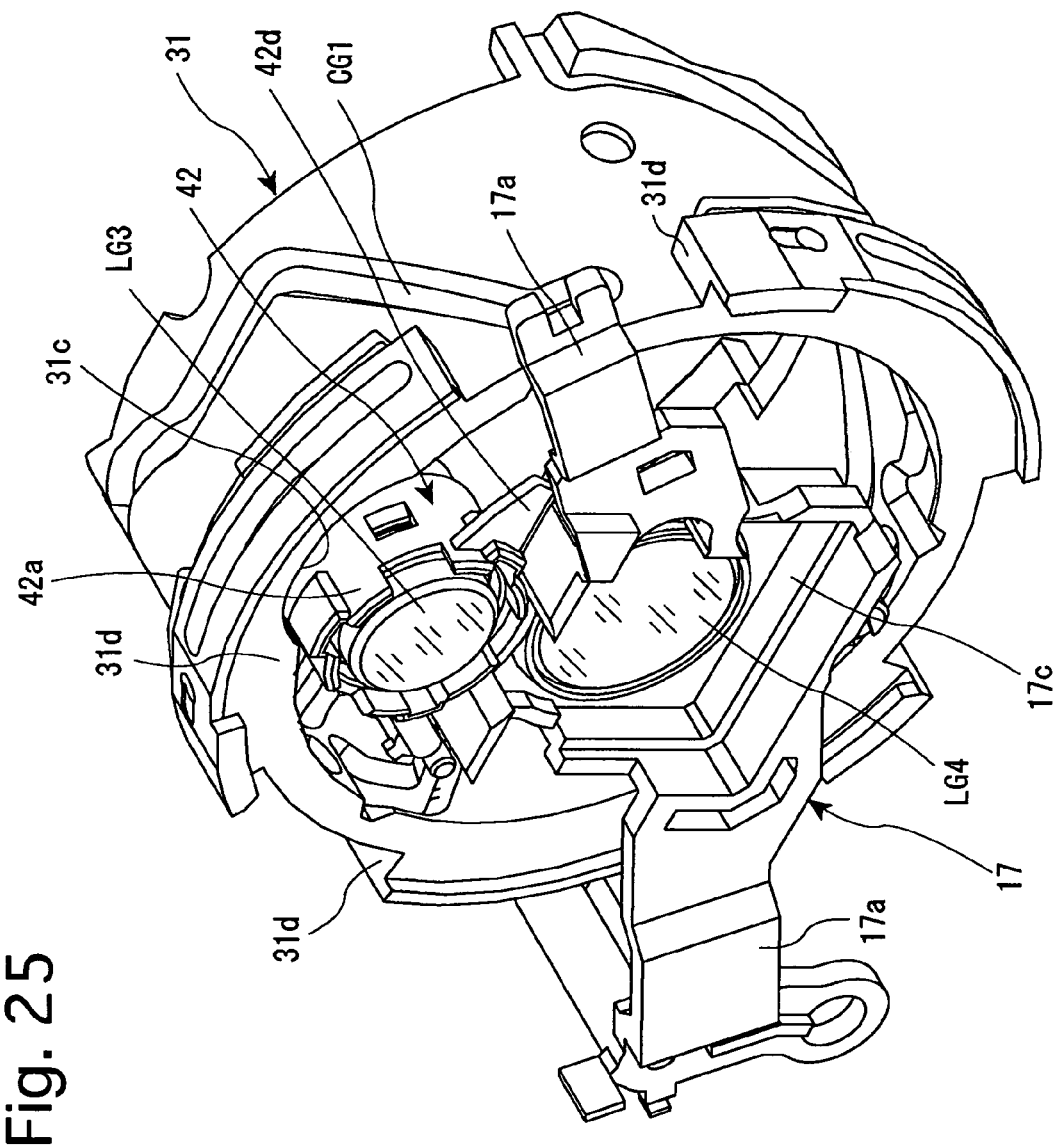
FIG. 25 is a view similar to that of FIG. 24, showing a state where the third lens group moving frame has been radially-retracted.

As shown in FIGS. 9, 23 and 25, the cam ring 31 is provided, on an inner peripheral surface thereof at a position which radially faces the radial opening 36h in the retracted state of the zoom lens 10, with a radial recess (accommodating portion) 31c which is recessed radially outwards (upwards as viewed in FIG. 27) to correspond to the shape of an outer peripheral surface of the cylindrical lens holder portion 42a of the third lens frame 42, so that the outer region of the cylindrical lens holder portion 42a can partly enter the radial recess 31c. As shown in FIG. 20, the radial recess 31c is formed on a portion of the inner peripheral surface of the cam ring 31 on which neither the set of three rear inner cam grooves CG2 or the set of three front inner cam grooves CG3 is formed. In other words, the radial recess 31c is formed on the inner peripheral surface of the cam ring 31 within a triangular area thereof behind a substantially inverted-V shaped portion of one of the three rear inner cam grooves CG2 as viewed in FIG. 20. Accordingly, the radial recess 31c is formed on a portion of the inner peripheral surface of the cam ring 31 which does not interfere with either the set of three rear inner cam grooves CG2 or the set of three front inner cam grooves CG3. The cam ring 31 is further provided, on an outer peripheral surface thereof at different circumferential positions in the vicinity of the rear end of the cam ring 31, with three external protuberances 31d which project radially outwards. The radial recess 31c is formed on a portion of the inner peripheral surface of the cam ring 31 which corresponds to an inner peripheral surface of one of the three external protuberances 31d. Therefore, portions of the cam ring 31 on which the three external protuberances 31d are formed, respectively, have a sufficient wall thickness, and accordingly, the cam ring 31 secures a sufficient strength even though the radial recess 31c is formed on the inner peripheral surface of the cam ring 31. In other words, the cam ring 31 can be prevented from increasing in size by forming the radial recess 31c on the portion of the inner peripheral surface of the cam ring 31 which corresponds to an inner peripheral surface of one of the three external protuberances 31d. The three external protuberances 31d are not mere reinforcing members, but are also provided on inner peripheral surfaces thereof with the discontinuous circumferential groove 31a, and are further provided on outer peripheral surfaces of the three external protuberances 31d with the discontinuous circumferential groove 31b. Additionally, the three external protuberances 31d support the set of three roller followers 32, respectively.

The third lens frame 42 is supported by the third lens group moving frame 36 therein in a manner such that the cylindrical pivot portion 42c is positioned on the front side of the central inner flange 36e and that the cylindrical lens holder portion 42a projects into the space behind the central inner flange 36e. Due to this structure, the swing arm portion 42b is provided with a stepped portion 42g (see FIG. 28) which is stepped in the optical axis direction to extend through the opening 36f of the third lens group moving frame 36.

Due to such a structure which supports the third lens frame 42, the third lens frame 42 is rotatable (swingable)

about the pivot shaft 44 in a predetermined range of rotation relative to the third lens group moving frame 36 and the cam ring 31. Specifically, the range of rotation of the third lens frame 42 ranges from a lower rotation limit at which the engaging protrusion 42d comes in contact with the rotation limit pin 46 to an upper rotation limit at which a portion of the third lens frame 42 (e.g., the rear projecting portion 42e) comes in contact with a portion of the third lens group moving frame 36 (e.g., a recessed portion 36f1 formed on the inner edge of the central inner flange 36e in the opening 36f). Since the pivot shaft 44 extends parallel to the photographing optical axis Z1, the third lens group LG3 swings about the pivot shaft 44 in the internal space of the third lens group moving frame 36 behind the central inner flange 36e while the optical axis thereof remains parallel to the photographing optical axis Z1 when the third lens frame 42 swings.

A coil portion of the torsion coil spring 47 is fitted on the cylindrical pivot portion 42c of the third lens frame 42, one of the opposite spring ends (a forward-projecting spring end) of the torsion coil spring 47 is engaged with the swing arm portion 42b, and the other spring end (a rearward-projecting spring end) of the torsion coil spring 47 is engaged with the central inner flange 36e. The torsion coil spring 47 biases the third lens frame 42 to rotate about the pivot shaft 44 clockwise as viewed in FIGS. 26 and 27. The limit of rotation of the third lens frame 42 in this biasing direction of the torsion coil spring 47, i.e., the photographing position of the third lens group LG3, is determined by the engagement of the engaging protrusion 42d with the rotation limit pin 46. The rotation limit pin 46 is formed as a rotatable eccentric pin so that the point of engagement of the eccentric pin with the engaging protrusion 42d can be adjusted by rotating the rotation limit pin 46.

The AF lens frame 17, which is positioned behind the third lens group moving frame 36, is provided with a forwardly-projecting lens holder portion 17c, a first arm portion 17a and a second arm portion 17b (see FIG. 6). The first arm portion 17a and the second arm portion 17b are positioned on radially opposite sides of the forwardly-projecting lens holder portion 17c. The forwardly-projecting lens holder portion 17c is positioned in front of the first arm portion 17a and the second arm portion 17b in the optical axis direction. The pair of guide holes in which the pair of AF guide shafts 18A and 18B are respectively fitted are formed on the first arm portion 17a and the second arm portion 17b, respectively. The forwardly-projecting lens holder portion 17c is formed in a hollow box shape (rectangular ring shape) which surrounds the photographing optical axis Z1. The forwardly-projecting lens holder portion 17c is provided on the front end surface thereof with a circular opening in which the fourth lens group LG4 is fitted to be fixed thereto. The rear end of the forwardly-projecting lens holder portion 17c is formed as an open end which is open toward the low-pass filter 11 (see FIGS. 1 and 2).

As shown in FIG. 2, the AF lens frame 17 can move rearward in the optical axis direction to a point (rear limit for the axial movement of the AF lens frame 17) at which the low-pass filter 11 and the CCD image sensor 12 enter the forwardly-projecting lens holder portion 17c from the rear thereof. Note that since FIG. 2 shows a sectional view through the photographing optical axis Z1, the portion of the forwardly-projecting lens holder portion 17c at such a sectional plane is shown extending rearwards only by a small amount; however, other circumferential portions of the forwardly-projecting lens holder portion 17c extend rearwards sufficient to cover the low-pass filter 11 and the CCD image sensor 12 in the optical axis direction. Upon the AF lens frame 17 moving to this rear limit, a front end of the position-control cam bar 49 that projects forward from the CCD holder 14 in the optical axis direction is positioned in front of the AF lens frame 17 in the optical axis direction. As described above, the retracting cam surface 49a that lies in a plane inclined with respect to the photographing optical axis Z1 is formed on a front end surface of the position-control cam bar 49, and the radially-retracted-position holding surface 49b which extends parallel to the photographing optical axis Z1 is formed on an inner side edge of the position-control cam bar 49 which extends from the retracting cam surface 49a (see FIG. 21). The cam-bar insertable hole 36g and the position-control cam bar 49 are aligned in the optical axis direction so that the position-control cam bar 49 can insert and withdraw through the cam-bar insertable hole 36g.

Operations of the third lens group LG3 and other associated elements, which are supported by the above described a structure for retracting the third lens frame 42 to the radially-retracted position thereof, will be hereinafter discussed. The position of the third lens group moving frame 36 with respect to the CCD holder 14 in the optical axis direction is determined by a combination of the axial movement of the cam ring 31 by the cam diagrams of the set of three front inner cam grooves CG3 and the axial movement of the cam ring 31 itself. Namely, the third lens group moving frame 36 is positioned away from the CCD holder 14 when the zoom lens 10 is moved to the wide-angle extremity, or in the vicinity thereof, as shown by an upper half of the zoom lens 10 in FIG. 1, and is positioned closest to the CCD holder 14 when the zoom lens 10 is in the retracted state as shown in FIG. 2. The third lens group LG3 is retracted to the radially-retracted position thereof by utilizing the retracting rearward movement of the third lens group moving frame 36 from the axial position thereof at the wide-angle extremity to the rearmost axial position (retracted position) of the third lens group moving frame 36.

In the zooming range between the wide-angle extremity and the telephoto extremity, the third lens frame 42 is held stationary via contact-engagement of the end of the engaging protrusion 42d with the rotation limit pin 46 by the spring force of the torsion coil spring 47. At this time, the optical axis of the third lens group LG3 is coincident with the photographing optical axis Z1 as shown in FIG. 1, so that the third lens frame 42 is in a photographing position thereof. When the third lens frame 42 is in a photographing position thereof as shown in FIG. 1, the position control arm 42f is exposed to the rear of the third lens group moving frame 36 through the cam-bar insertable hole 36g (see FIG. 26).

Upon the main switch of the digital camera being turned OFF in the ready-to-photograph state of the zoom lens 10, the AF motor 19 is driven to rotate in the lens barrel retracting direction to move the AF lens frame 17 rearward, toward the CCD holder 14, to the rearmost position (retracted position) of the AF lens frame 17 as shown in FIG. 2. At this time, the low-pass filter 11 and the CCD image sensor 12, which are supported by the CCD holder 14, enter the forwardly-projecting lens holder portion 17c from the rear thereof to reduce the distance between the fourth lens group LG4 and the low-pass filter 11. Upon the AF lens frame 17 reaching the rearmost position thereof as shown in FIG. 2, the front end of the position-control cam bar 49 is positioned in front of the AF lens frame 17 in the optical axis direction.

Subsequently, the zoom motor 23 is driven in the lens barrel retracting direction to perform the above described lens barrel retracting operation. Further driving of the zoom motor 23 to retract the zoom lens 10 in the lens barrel retracting direction beyond the wide-angle extremity of the zoom lens 10 causes the cam ring 31 to move rearward in the optical axis direction while rotating about the photographing optical axis Z1 due to the engagement of the set of three roller followers 32 with the set of three through slots 30e (the first lead slot portions 30e-2 thereof), respectively. As can be understood from comparing FIGS. 1 and 2, even though the third lens group moving frame 36 is positioned closer to the front of the zoom lens 10 in the optical axis direction relative to the cam ring 31 when the zoom lens 10 is in the retracted position than when the zoom lens 10 is in the wide-angle extremity, the third lens group moving frame 36 comes near the CCD holder 14 when the zoom lens 10 is in the retracted state because the amount of rearward movement of the cam ring 31 relative to the stationary barrel 13 is greater than the amount of forward movement of the third lens group moving frame 36 in the cam ring 31 relative to the cam ring 31 in the lens barrel retracting operation.

Further retracting movement of the third lens group moving frame 36 together with the third lens frame 42 causes the front end of the position-control cam bar 49 to enter the cam-bar insertable hole 36g. The position control arm 42f is exposed to the rear of the third lens group moving frame 36 through the cam-bar insertable hole 36g as described above, and the retracting cam surface 49a of the position-control cam bar 49 which enters the cam-bar insertable hole 36g comes in contact with the position control arm 42f. The retracting cam surface 49a of the position-control cam bar 49 serves as a lead surface which is shaped to produce a component of force making the third lens frame 42 rotate about the pivot shaft 44 counterclockwise as viewed in FIGS. 26 and 27 while approaching the position control arm 42f in the optical axis direction. Therefore, a rearward movement of the third lens frame 42 together with the third lens group moving frame 36 with the retracting cam surface 49a remaining in contact with the position control arm 42f causes the third lens frame 42 to rotate in a direction to make the engaging protrusion 42d move away from the rotation limit pin 46 (i.e., in a direction so as to move the cylindrical lens holder portion 42a upwards) against the spring force of the torsion coil spring 47.

Upon receiving a rotational force from the retracting cam surface 49a, the third lens frame 42 rotates about the pivot shaft 44 against the spring force of the torsion coil spring 47 from the photographing position shown in FIGS. 22 and 26 toward the radially-retracted position shown in FIGS. 23 and 27 in accordance with the retracting movement of the third lens group moving frame 36 in the optical axis direction. Upon the third lens frame 42 rotating to the radially-retracted position shown in FIGS. 23 and 27, the position control arm 42f of the third lens frame 42 slides on the position-control cam bar 49 from the retracting cam surface 49a to the radially-retracted-position holding surface 49b to be engaged therewith. In this state where the position control arm 42f is engaged with the radially-retracted-position holding surface 49b, the third lens frame 42 is no longer rotated about the pivot shaft 44 in a direction to the radially-retracted position (upwards) by a retracting movement of the third lens group moving frame 36 because the radially-retracted-position holding surface 49b of the position-control cam bar 49 extends parallel to the optical axis Z1. At the same time, the radially-retracted-position holding surface 49b prevents the third lens frame 42 from rotating in a direction toward the photographing position by the spring force of the torsion coil spring 47 to hold the third lens frame 42 in the radially-retracted position.

Figure 4:
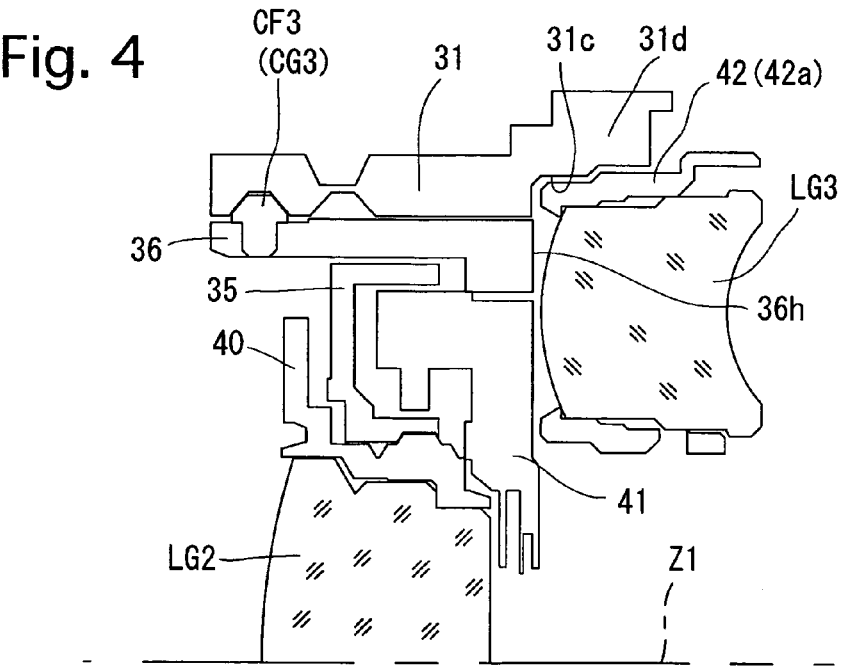
FIG. 4 is a longitudinal sectional view of a portion of the support structure which supports the second lens group and the third lens group of the zoom lens in the retracted state shown in FIG. 2.

As shown in FIGS. 4, 23 and 27, the cylindrical lens holder portion 42a of the third lens frame 42 enters the radial opening 36h to partly project radially outwards from the outer peripheral surface of the third lens group moving frame 36 when the third lens frame 42 is in the radially-retracted position. When the third lens frame 42 is in the radially-retracted position, the cam ring 31 is positioned immediately outside of the third lens group moving frame 36, and the outer region of the cylindrical lens holder portion 42a which partly projects radially outwards from the outer peripheral surface of the third lens group moving frame 36 through the radial opening 36h partly enters the radial recess 31c of the cam ring 31.

Figure 24:
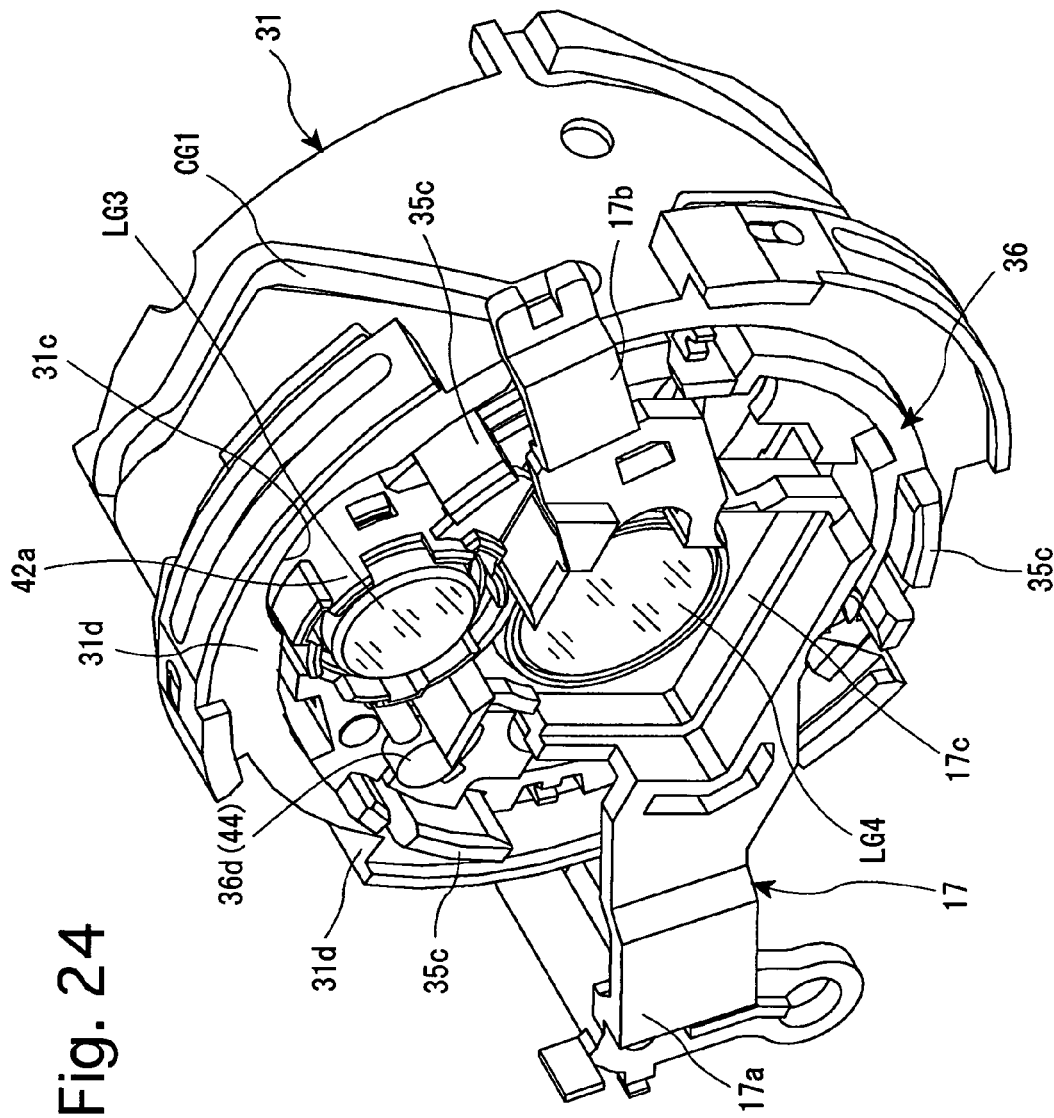
FIG. 24 is a view similar to that of FIG. 23, showing the cam ring, the third lens group moving frame, the third lens frame and an AF lens frame in the retracted state of the zoom lens.

As can be understood from FIGS. 24 and 25, in the retracted state of the zoom lens 10, the cylindrical lens holder portion 42a is positioned radially outside of the forwardly-projecting lens holder portion 17c, and accordingly, the cylindrical lens holder portion 42a cannot be brought any closer to the photographing optical axis Z1. Therefore, if the radial recess 31c was not formed on the cam ring 31, it will be necessary for the cam ring 31 to have a greater inner diameter than the cam ring 31 of the present embodiment to prevent the cam ring 31 from interfering with the cylindrical lens holder portion 42a of the third lens frame 42 when it is in the radially-retracted position. However, in the present embodiment of the zoom lens 10, in which the third lens group LG3 (the cylindrical lens holder portion 42a) is partly accommodated in the radial recess 31c of the cam ring 31, the inner diameter of the cam ring 31 and the outer diameter of the third lens group moving frame 36 can be reduced by an amount corresponding to the radial depth of the radial recess 31c. This contributes to the reduction in diameter of the zoom lens 10.

However, the third lens group moving frame 36 that supports the third lens frame 42 is a linearly movable member which linearly moves in the optical axis direction without rotating, whereas the cam ring 31 is a rotatable member, and accordingly, the circumferential positions of the radial recess 31c and the radial opening 36h about the photographing optical axis Z1 correspond to each other to prevent the cam ring 31 and the third lens frame 42 from interfering with each other when the cylindrical lens holder portion 42a enters the radial recess 31c of the cam ring 31. The present embodiment of the zoom lens 10 is provided with an idle mechanism (which is composed of the set of three relative rotation allowing grooves 25f, the circumferential slot portions 30e-1 of the set of three through slots 30e and the set of three roller followers 32) which prevents the cam ring 31 from rotating even if the helicoid ring 25 and the third external barrel 26 rotate in an initial stage of the advancing operation of the zoom lens 10 from the retracted state of the zoom lens 10 as described above. Due to this idle mechanism, when the zoom lens 10 is retracted in the lens barrel retracting direction from the wide-angle extremity, the cam ring 31 stops rotating at a predetermined point in front of the retracted position thereof (at a point before the combination of the helicoid ring 25 and the third external barrel 26 rotates by an angle of approximately 30 degrees to reach their respective retracted positions), and from then on the cam ring 31 is linearly moved rearward in the optical axis direction without rotating. The angle of installation of the cam ring 31 is determined so that the circumferential positions of the radial recess 31c and the radial opening 36h about the photographing optical axis Z1 securely correspond to each other in such a non-rotating state of the cam ring 31. Therefore, when the outer region of the cylindrical lens holder portion 42*a* partly enters the radial recess 31*c* of the cam ring 31, a state in which the radial recess 31*c* and the radial opening 36*h* are communicatively connected to each other in a radial direction of the zoom lens 10 is maintained to thereby prevent the cylindrical lens holder portion 42*a* and the cam ring 31 from interfering with each other.

As can be understood from the above description, in the above described embodiment of the movable lens control device, it is determined whether the fourth lens group LG4 is in the normal moving range after the commencement of forward movement of the third lens group LG3 (and also the first and second lens groups LG1 and LG2) from the retracted position (initial position) thereof, and only when it is determined that the fourth lens group LG4 is out of the normal moving range, the fourth lens group LG4 is moved rearward to the retracted position (in a predetermined range) thereof while the third lens group LG3 is temporarily stopped from moving. Therefore, the first through fourth lens groups LG1 through LG4 can be moved more smoothly than in the case of using a control system which determines the position of the fourth lens group LG4 upon the main switch SW being turned ON.

Moreover, in the above described embodiment of the zoom lens 10, the third lens group LG3 (the third lens frame 42) is retracted radially outwards not only into the space inside of the third lens group moving frame 36 but also partly into the space in a recess (the radial recess 31*c*) formed on the cam ring 31 that is positioned immediately outside of the third lens group moving frame 36 when the third lens group LG3 (the third lens frame 42) is radially-retracted outside of the photographing optical axis Z1, which achieves a further miniaturization of the zoom lens 10.

The third lens group moving frame 36 that supports the third lens frame 42 is a linearly movable member which linearly moves in the optical axis direction without rotating, whereas the cam ring 31 that is positioned immediately outside of the third lens group moving frame 36 is a rotatable member as described above. However, when the third lens frame 42 partly enters the radial recess 31*c* of the cam ring by rotating to the radially-retracted position, the third lens frame 42 and the cam ring 31 do not interfere with each other, preventing damage thereto because the zoom lens 10 is provided with the above described idle mechanism which prevents the cam ring 31 from rotating in a final stage of the retracting operation of the zoom lens 10 (a stage in which the third lens frame 42 starts being radially-retracted outside of the photographing optical axis Z1).

Note that the timing at which the cam ring 31 stops rotating when the zoom lens 10 is retracted to the retracted position and the timing at which the third lens frame 42 starts retracting to the radially-retracted position can be freely determined as long as the requirement that the cam ring 31 already stops rotating upon at least the outer region of the cylindrical lens holder portion 42*a* of the third lens frame 42 entering the radial recess 31*c* of the cam ring 31 is satisfied.

Although the above discussion has been addressed to the above described embodiment of the zoom lens, the present invention is not limited solely to this particular embodiment. The present invention can be applied to any another type of lens barrels; e.g., a lens barrel in which a third lens group, which corresponds to the third lens group LG3, is not radially-retracted out of a photographing optical axis (which corresponds to the photographing optical axis Z1), a lens barrel which includes a photographing optical system consisting of more than or less than four lens groups, or a non-retractable lens barrel. Additionally, although an accommodating portion, formed on the cam ring 31 (rotatable member), for accommodating a part of the cylindrical lens holder portion 42*a* (the third lens group LG3) when the third lens frame 42 is retracted to the radially-retracted position is formed as a bottomed recess (the radial recess 31*c* in the above described embodiment of the zoom lens), the accommodating portion can be formed on the rotatable member as a through-hole which extends through the rotatable member in a radial direction thereof if sufficient strength of the rotatable member is ensured.

Although the cam ring 31 of the above described embodiment of the zoom lens is of a type which moves in the optical axis direction while continuously rotating after the aforementioned initial stage of the advancing operation of the zoom lens 10 from the retracted state of the zoom lens 10 (i.e., after an idle stage in which the cam ring 31 does not rotate but moves only in the optical axis direction though the helicoid ring 25 and the third external barrel 26 rotate), the present invention is applicable even if the cam ring is of a different type which rotates at a fixed axial position after having been extended forward to a ready-to-photograph position in the range of movement of the cam ring in the optical axis direction.

Although the cam ring 31 is used as a rotatable member for moving lens groups via cam grooves (cam slots) in the above described embodiment of the zoom lens, the present invention can be applied to any other type of lens barrel using a rotatable member other than such a cam ring as long as the rotatable member can move optical elements by rotation of the rotatable member.

Although the rotating drive member which transfers torque to the cam ring 31 is divided into two parts, i.e., the helicoid ring 25 and the third external barrel 26, in the above described embodiment of the zoom lens, the present invention can be applied to another type of retractable lens barrel using an integral-type rotating drive member which is formed by integrating a helicoid ring and a third external barrel as one integral body which respectively correspond to the helicoid ring 25 and the third external barrel 26. In this case, the set of three rotation transfer grooves 26*c* and the set of three relative rotation allowing grooves 25*f* can be formed as a set of three continuous grooves on the integral-type rotating drive member, respectively.

Although the above described embodiment of the lens barrel is a zoom lens barrel, the present invention can be applied to movable lens groups (lens barrel) having no zoom function.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A movable lens control device for controlling movements of a plurality of movable lens groups of a photographing optical system in an optical axis direction, said plurality of movable lens groups including at least one first movable lens group and a second movable lens group, said movable lens control device comprising:

a lens driving device for moving said first movable lens group and said second movable lens group in said optical axis direction;

a position detector for detecting a position of said second movable lens group and determining whether said second movable lens group is in a predetermined normal moving range thereof; and a controller which controls operations of said lens driving device to stop said first movable lens group and to move said second movable lens group to a position within said normal moving range upon said position detector determining that said second movable lens group is positioned outside of said normal moving range during a movement of said first movable lens group from a predetermined initial position thereof.

2. The movable lens control device according to claim 1, wherein said controller operates to resume said movement of said first movable lens group after moving said second movable lens group to said position within said normal moving range.

3. The movable lens control device according to claim 1, wherein said first movable lens group comprises at least one zooming lens group which is moved in said optical axis direction to perform a zooming operation, and wherein said second movable lens group comprises at least one focusing lens group which is moved in said optical axis direction to perform a focusing operation.

4. The movable lens control device according to claim 3, wherein said controller operates to stop said zooming lens group and to move said focusing lens group to said position within said normal moving range upon said position detector determining that said focusing lens group is outside of said normal moving range at some point during the time said zooming lens group moves from said initial position to a ready-to-photograph position thereof.

5. The movable lens control device according to claim 4, wherein a portion of said zooming lens group comprises a radially-retractable optical element which is movable between a position on said optical axis and a radially-retracted position outside of said optical axis, and which is movable rearward in a direction parallel to said optical axis by a predetermined amount of movement when in said radially-retracted position, wherein a lens barrel of said photographing optical system in which said zooming lens group and said focusing lens group are incorporated comprises:

a linearly movable frame which supports said radially-retractable optical element, and is guided linearly in said optical axis direction;

a rotatable member, positioned around said linearly movable frame, for moving each of a plurality of optical element support frames including said linearly movable frame which support said plurality of movable lens groups, respectively, between a ready-to-photograph position and a retracted position in said optical axis direction when said rotatable member is rotated by a rotating drive member; and a retracting member which retracts said radially-retractable optical element to said radially-retracted position from said position on said optical axis by a force produced by a relative movement between said linearly movable frame and said retracting member, wherein said position detector determines whether said focusing lens group is in said normal moving range when said radially-retractable optical element moves forward from said predetermined initial position thereof which corresponds to a limit of rearward movement of said radially-retractable optical element in said radially-retracted position.

6. The movable lens control device according to claim 5, wherein said lens barrel further comprises an accommodating portion formed on said rotatable member at a position thereon which coincides with both a position of said radially-retractable optical element in said optical axis direction and said radially-retracted position of said radially-retractable optical element when said linearly movable frame is in said retracted position, wherein at least a portion of said radially-retractable optical element enters said accommodating portion of said rotatable member when said radially-retractable optical element is moved to said radially-retracted position from said position on said optical axis.

7. The movable lens control device according to claim 6, further comprising an idle mechanism which prevents the rotating force of said rotating drive member from being transferred to said rotatable member in an initial stage of rotation of said rotating drive member in which said rotating drive member moves in said optical axis direction while rotating from a retracted position to a ready-to-photograph position thereof.

8. The movable lens control device according to claim 1, wherein said second movable lens group is a rearmost lens group among said plurality of movable lens groups.

9. The movable lens control device according to claim 3, wherein said lens driving device comprises a zoom motor and an AF motor for moving said zooming lens group and said focusing lens group in said optical axis direction, respectively.

10. The movable lens control device according to claim 3, wherein said position within said normal moving range of said second movable lens group corresponds to a limit of rearward movement of said second movable lens group in said optical axis direction.

11. The movable lens control device according to claim 1, wherein said first movable lens group comprises at least two movable lens groups.

12. The movable lens control device according to claim 5, wherein said lens barrel, in which said zooming lens group and said focusing lens group are incorporated, comprises a retractable lens barrel.

13. The movable lens control device according to claim 5, wherein said radially-retractable optical element is rotatable about a pivot between said position on said optical axis and said radially-retracted position, said pivot being fixed to said linearly movable frame to extend parallel to said optical axis.

14. The movable lens control device according to claim 5, wherein said rotatable member comprises a cam ring having a plurality of cam grooves on a periphery of said cam ring, said linearly movable frame being moved in said optical axis direction by a rotation of said cam ring in accordance with contours of said plurality of cam grooves.

15. The movable lens control device according to claim 14, wherein said cam ring is movable in said optical axis direction while rotating by a rotating force of said rotating drive member.

* * * * *